Aug. 22, 1933.　　　　J. BEDFORD　　　　1,924,017
HYDRAULIC TRANSMISSION MECHANISM
Filed Oct. 5, 1931　　　18 Sheets-Sheet 1

J. Bedford
INVENTOR

By: Marks & Clark
ATTYS.

Aug. 22, 1933.  J. BEDFORD  1,924,017
HYDRAULIC TRANSMISSION MECHANISM
Filed Oct. 5, 1931    18 Sheets-Sheet 2

J. Bedford
INVENTOR

By: Marks & Clerk
Attys.

Aug. 22, 1933.  J. BEDFORD  1,924,017
HYDRAULIC TRANSMISSION MECHANISM
Filed Oct. 5, 1931  18 Sheets-Sheet 3

J. Bedford
INVENTOR
By Marks + Clark
Attys.

J. Bedford
INVENTOR
By: Marks & Clerk
ATTYS

Aug. 22, 1933.  J. BEDFORD  1,924,017
HYDRAULIC TRANSMISSION MECHANISM
Filed Oct. 5, 1931  18 Sheets-Sheet 5

J. Bedford
INVENTOR

By: Marks & Clerk
Attys.

Aug. 22, 1933.                J. BEDFORD                1,924,017
                    HYDRAULIC TRANSMISSION MECHANISM
                Filed Oct. 5, 1931        18 Sheets-Sheet 6
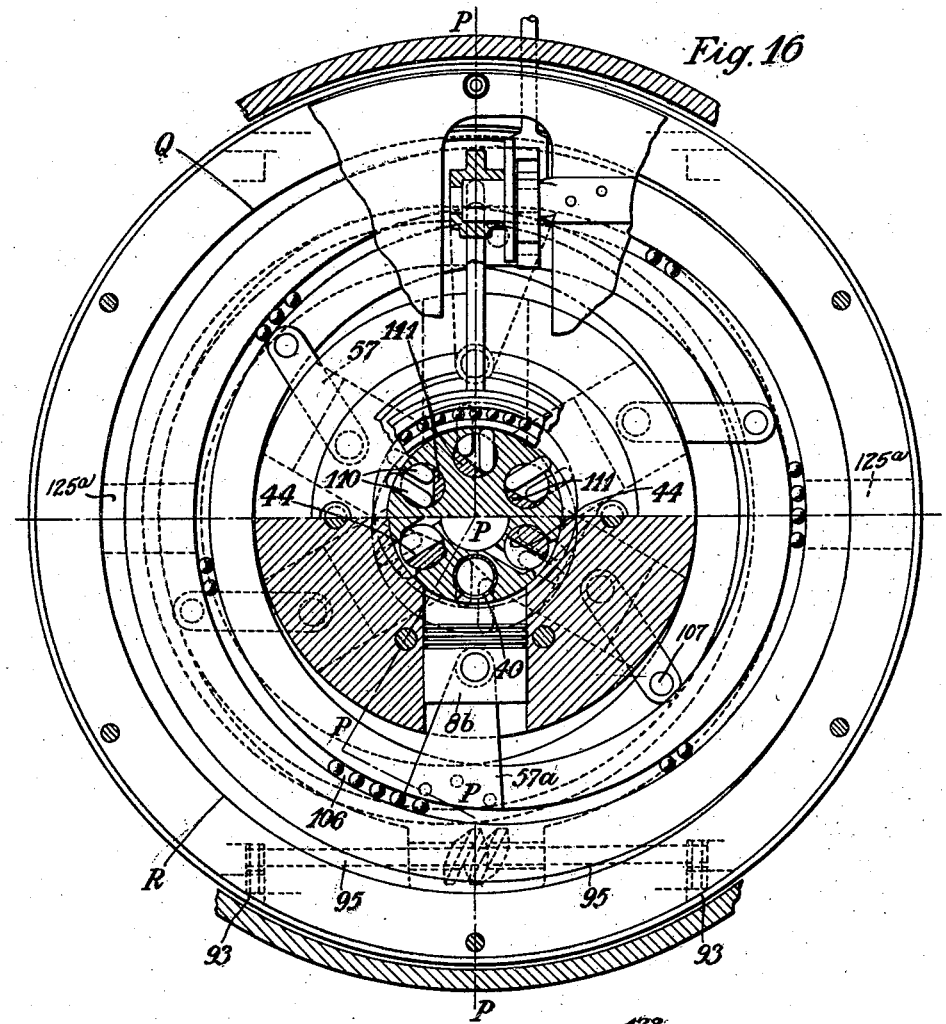
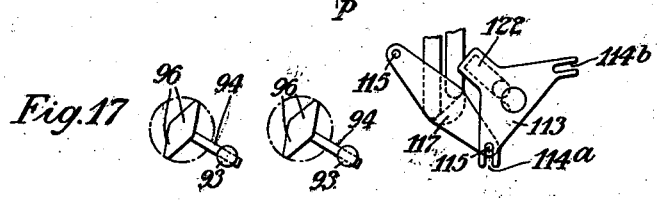
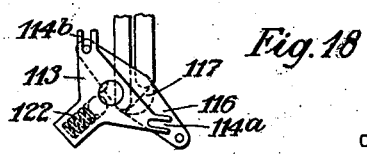
J. Bedford
INVENTOR
By: Marks & Clerk
ATTYS Aug. 22, 1933.   J. BEDFORD   1,924,017
HYDRAULIC TRANSMISSION MECHANISM
Filed Oct. 5, 1931    18 Sheets-Sheet 10

J. Bedford
INVENTOR
By: Marks & Clerk
Attys.

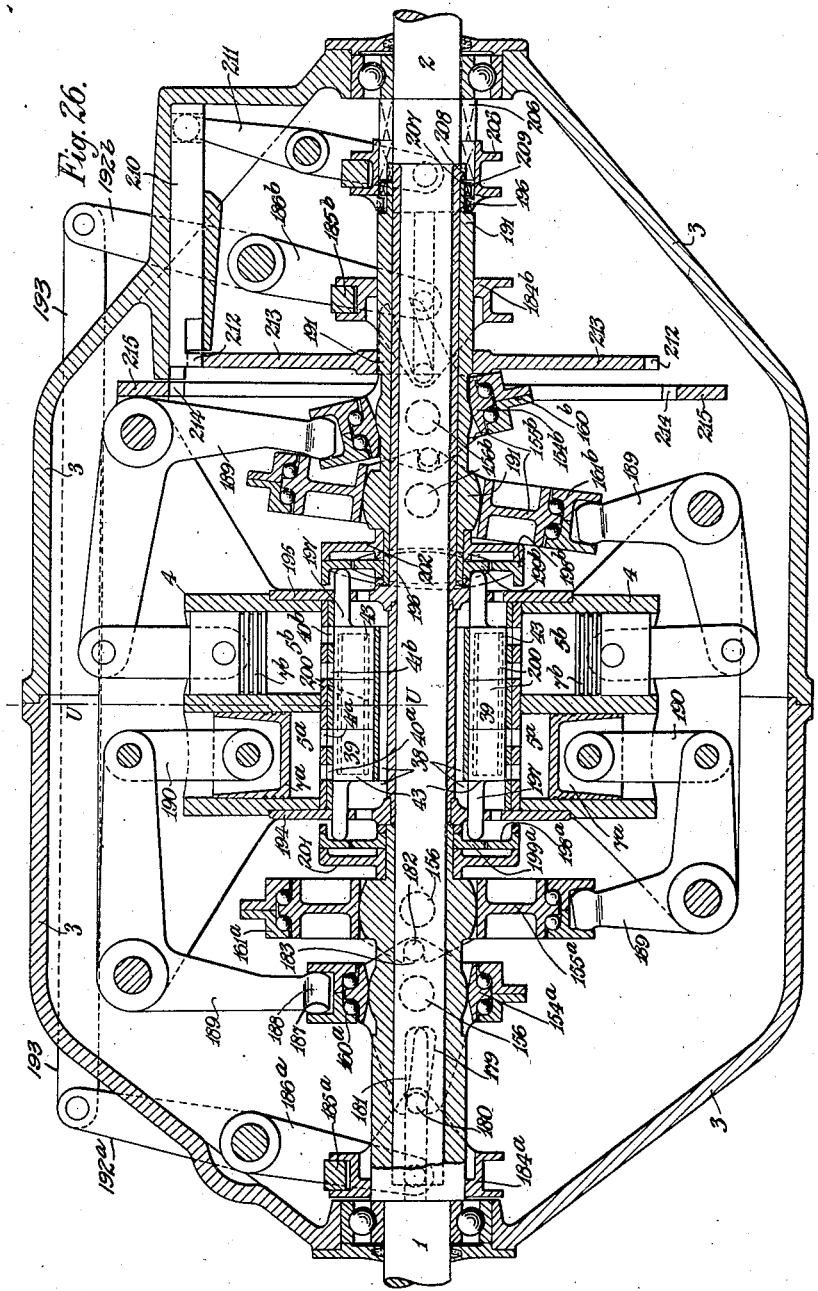

Aug. 22, 1933.　　　　　J. BEDFORD　　　　　1,924,017
HYDRAULIC TRANSMISSION MECHANISM
Filed Oct. 5, 1931　　18 Sheets-Sheet 13

J. Bedford
INVENTOR
By: Marks & Clark
ATYS.

Aug. 22, 1933.  J. BEDFORD  1,924,017
HYDRAULIC TRANSMISSION MECHANISM
Filed Oct. 5, 1931   18 Sheets-Sheet 14
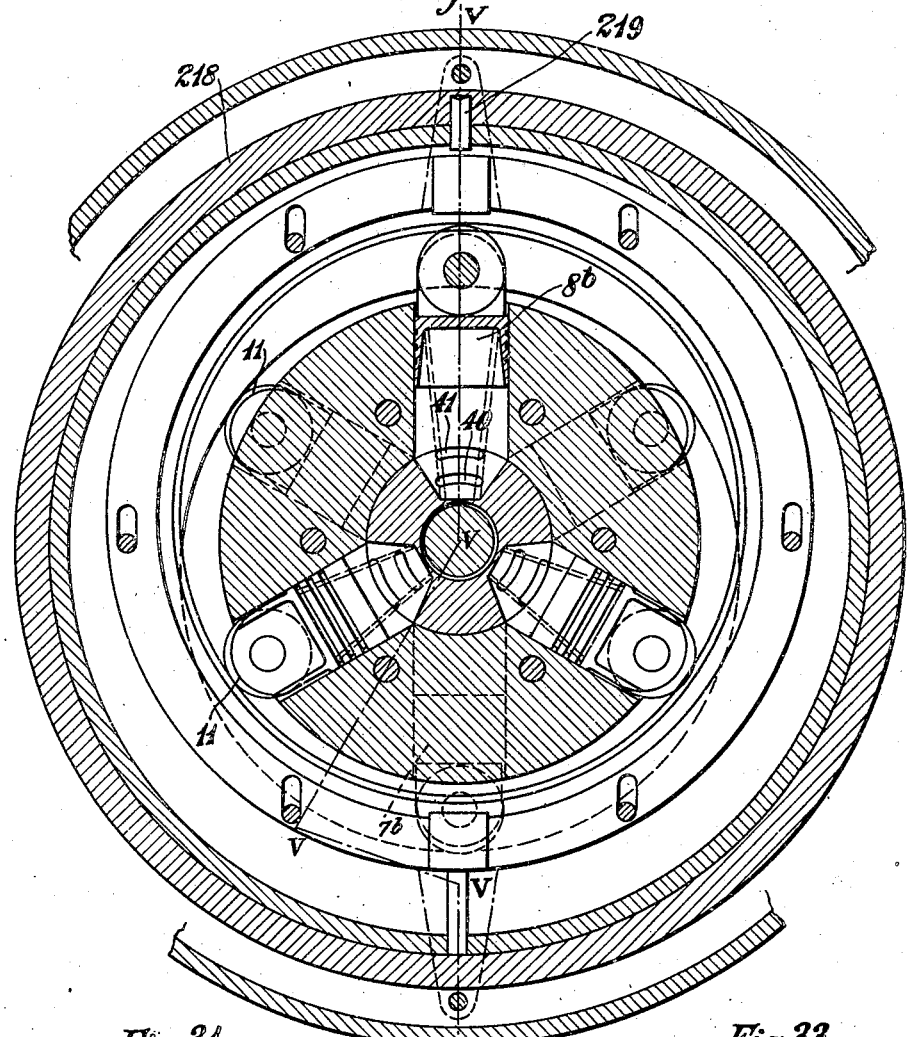
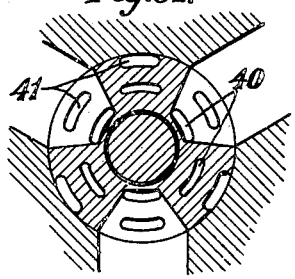
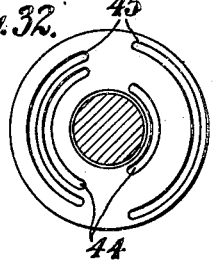
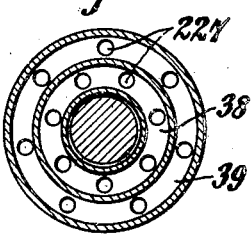
J. Bedford
INVENTOR
By Marks & Clerk
ATTYS.

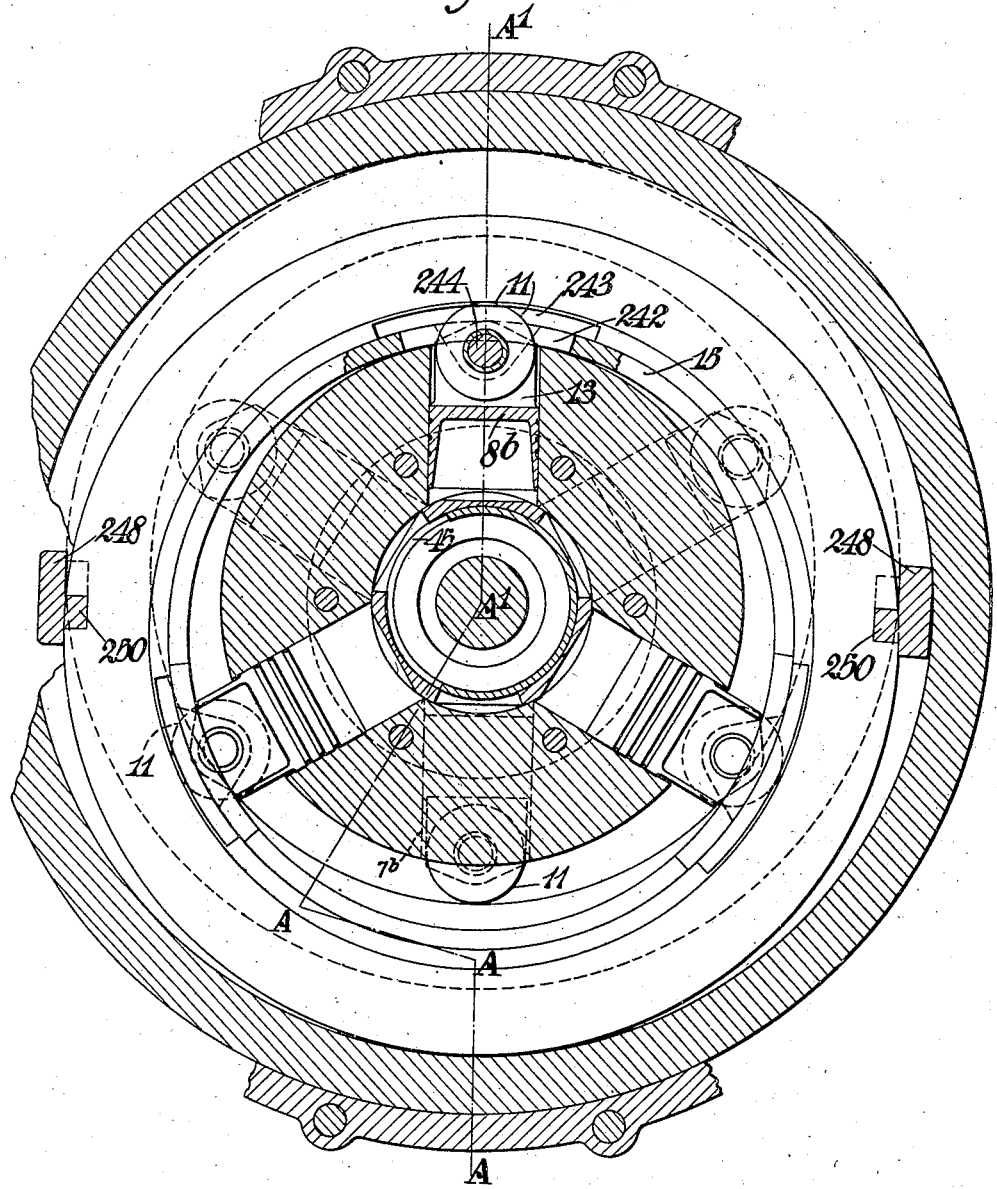

Aug. 22, 1933.                J. BEDFORD                1,924,017
                    HYDRAULIC TRANSMISSION MECHANISM
                    Filed Oct. 5, 1931      18 Sheets-Sheet 17
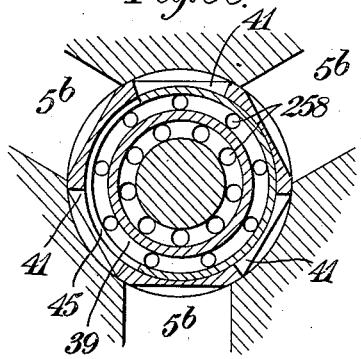
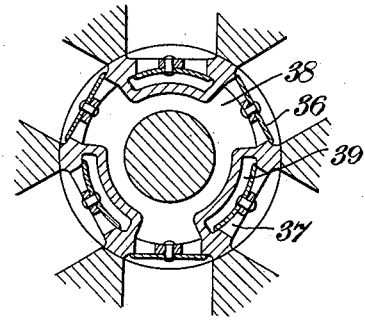
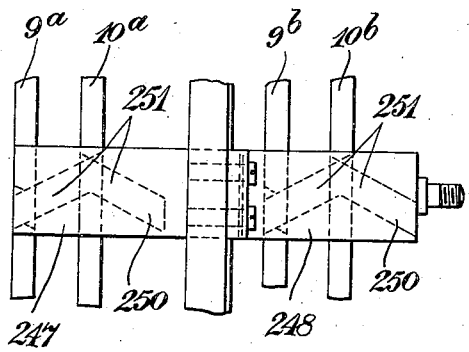
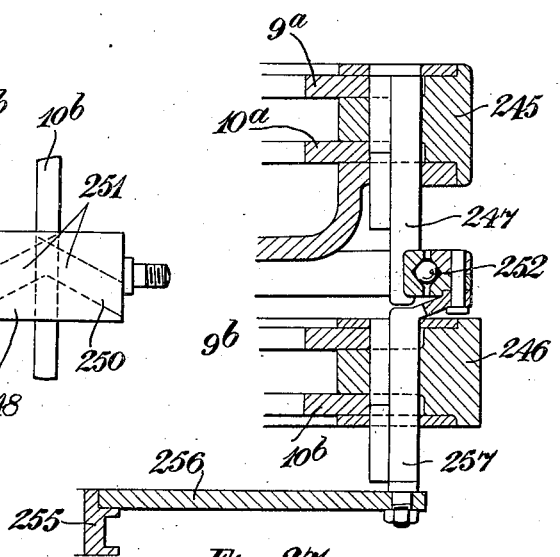
J. Bedford
INVENTOR
By: Marks & Clerk
        Attys.

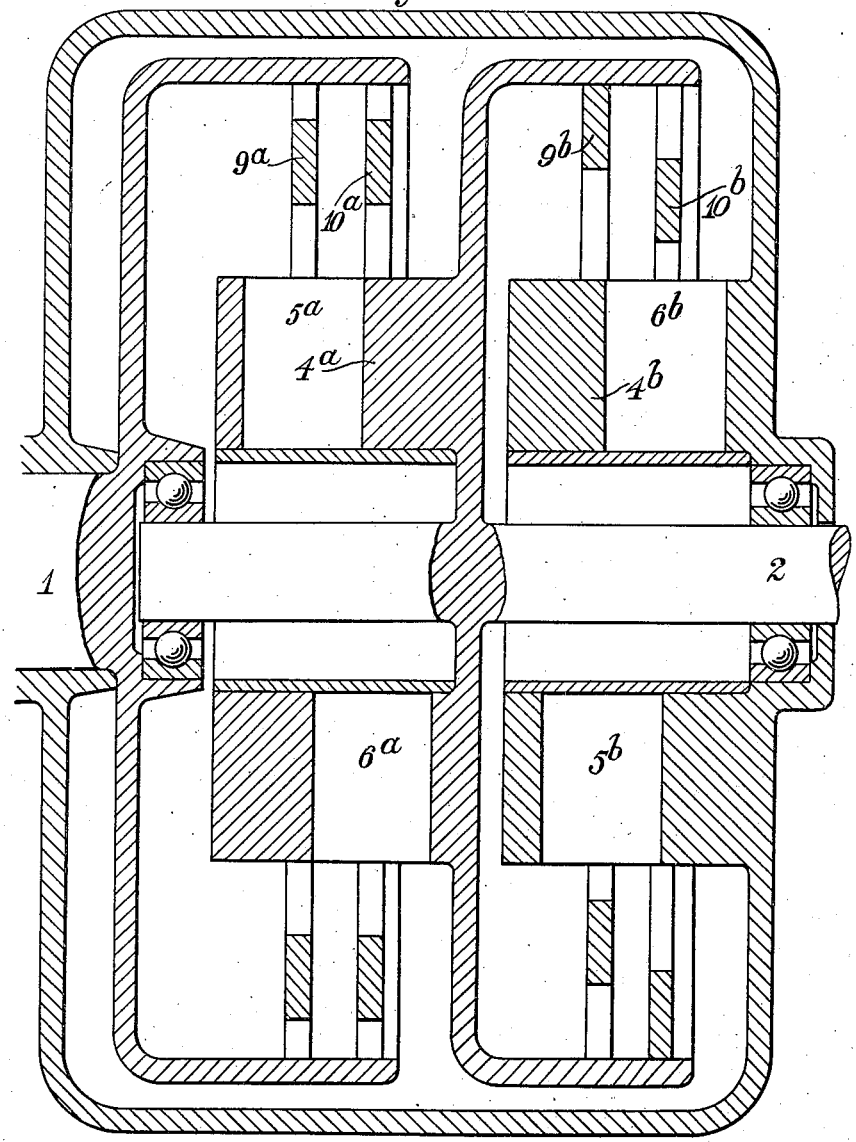

Patented Aug. 22, 1933

1,924,017

UNITED STATES PATENT OFFICE 1,924,017

HYDRAULIC TRANSMISSION MECHANISM

Jesse Bedford, Luton, England, assignor of one-half, to Matthew Clough Park, Luton, England Application October 5, 1931, Serial No. 567,092, and in Great Britain October 6, 1930

9 Claims. (Cl. 60—53)

This invention relates to improvements in hydraulic transmission mechanism such as that for transmitting motion from one shaft to another at any desired speed and in any desired direction.

It is an object of the present invention to simplify such mechanism and at the same time to eliminate friction gearing, gear wheels and chains and to reduce friction to a minimum.

A further object of the invention is to provide mechanism of the above kind which will give a smooth and infinitely variable effect and at the same time provide in one mechanism the functions of a clutch and a change-speed gear whilst eliminating the undesirable features of such mechanism.

A further object of the invention is to reduce relative motion between the working parts of such mechanism to a minimum and at the same time to so arrange the moving parts as to obtain dynamic and static balance whilst providing a uniform and balanced torque.

A still further object of the invention is to reduce the travel of the working fluid and the volume displaced to a minimum and thus utilize the energy of the fluid in the shortest space and most efficient manner.

Other objects of the invention will be apparent from the description given hereinafter.

The invention accordingly comprises hydraulic transmission mechanism embodying a variable delivery pump and a variable receiving pump or motor, said pumps being so arranged and adapted that as the capacity of the delivery pump is increased the capacity of the receiving pump or motor is decreased.

The invention also comprises hydraulic transmission mechanism according to the preceding paragraphs wherein the delivery pump comprises cylinders and means for reciprocating pistons therein and said cylinders and the means for reciprocating the pistons therein are rotatable.

The invention also comprises a gear according to the above paragraphs arranged so that when the capacity of the motor is zero a direct drive is transmitted between the driving and following shafts.

Further features of the invention will be hereinafter indicated or described.

In the accompanying drawings:—

Figure 9 is a sectional view of part of the control mechanism;

Figure 10 is a partial section taken on the line L—L of Figure 7 showing the arrangement of passages for the working fluid;

Figures 11, 12, 13 and 14 are partial sections of the gear taken respectively on the lines J—J, K—K, M—M, N—N of Figure 7 showing the arrangement of valve mechanism for the distribution of the working fluid;

Figure 16 is a part sectional end elevation of the gear, of which the portions Q, R are sections taken respectively on the lines Q—Q, R—R of Figure 15;

Figure 17 illustrates part of the control mechanism in position for direct forward drive;

Figure 18 illustrates the same part of the control mechanism in position for reverse drive;

Figure 26 is a sectional side elevation of still a further form of gear in accordance with the invention;

Figure 30 is a sectional end elevation of the gear taken on the line W—W of Figure 29;

Figures 31, 32 and 33 are partial sections of the gear taken respectively on the lines X—X, Y—Y and Z—Z of Figure 29 showing the arrangement of valve mechanism for distributing the working fluid;

Figure 35 is a sectional end elevation of the gear taken on the line B'—B' of Figure 34;

Figure 36 is an elevation of a part of the control mechanism;

Figure 37 is a sectional plan of another part of the control mechanism;

Figure 38 is a partial section taken on the line C'—C' of Figure 34 showing the arrangement of part of the valve mechanism used for distributing the working fluid;

Figure 39 is a partial section taken on the line D'—D' of Figure 34 showing the arrangement of further valve mechanism for distributing the working fluid, and Figure 40 is a diagrammatic arrangement of still a further form of gear in accordance with the invention.

Figure 1:
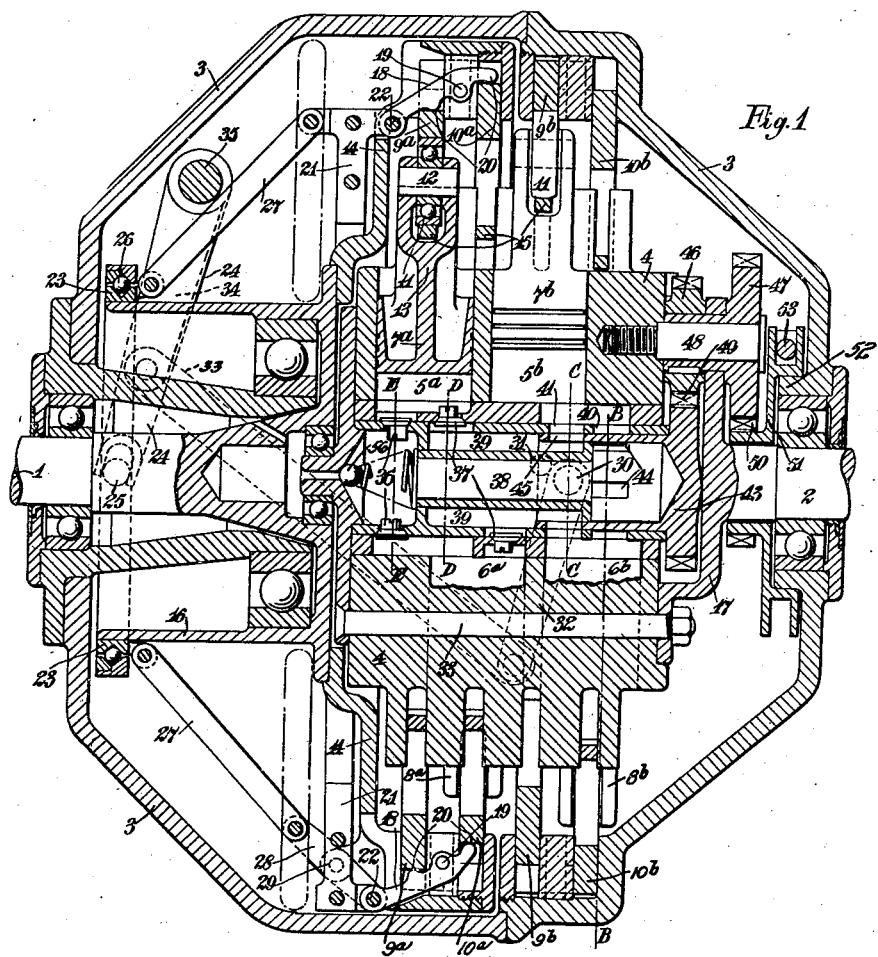
Figure 1 is a sectional side elevation of one form of gear in accordance with the invention taken on the line A—A of Figure 2.

In the following description, like reference numerals are used throughout to represent like parts and in the drawings the driving and following shafts are indicated by the references 1 and 2 respectively and the casing of the gear by the reference 3.

Figure 2:
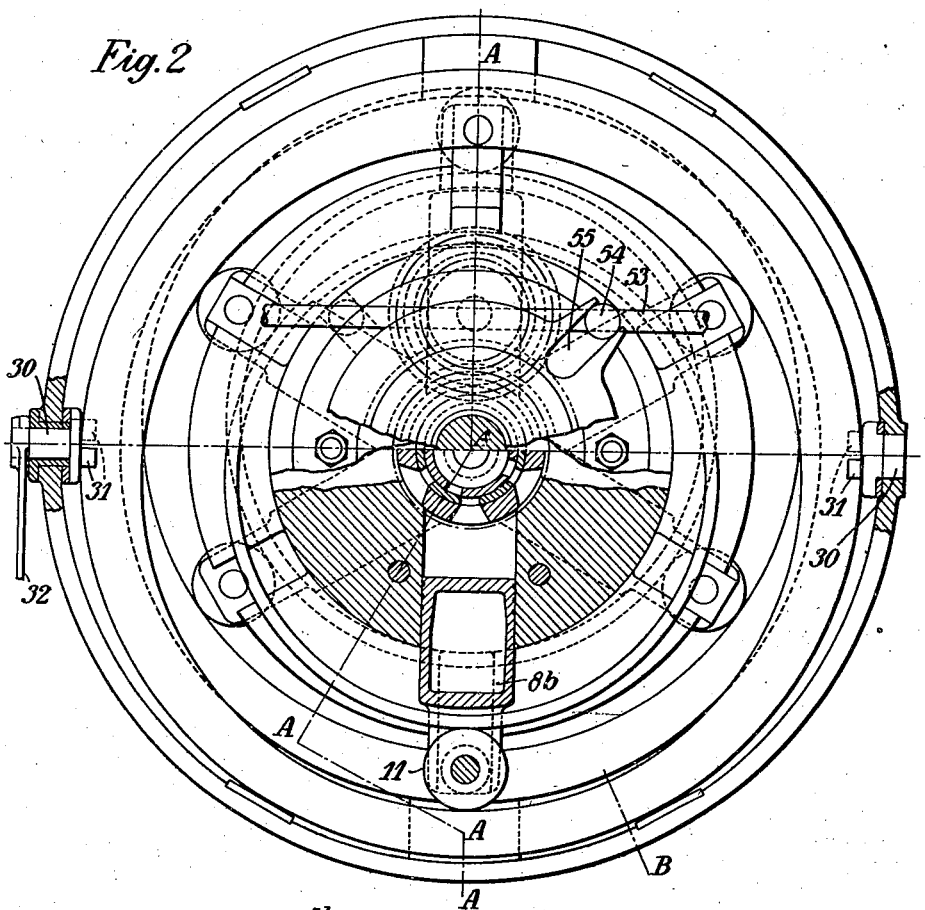
Figure 2 is a part sectional end elevation of gear of which the portion B is a section taken on the line B—B of Figure 1.
Figure 3:
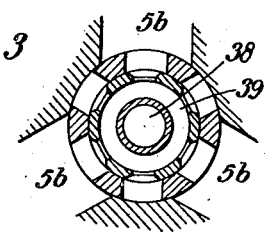
Figures 3, 4, 5 and 6 are partial sections of the gear taken respectively on the lines E—E, D—D, C—C and B—B of Figure 1 showing the construction of valve mechanism for distributing the working fluid.
Figure 4:
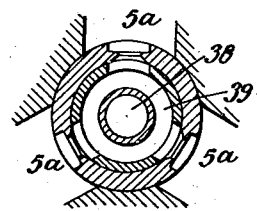
Figure 5:
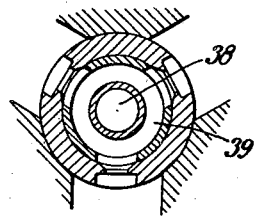
Figure 6:
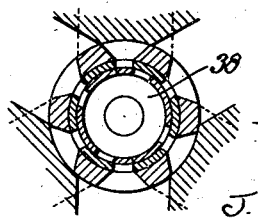

In carrying the invention into effect in one convenient manner and as illustrated in Figures 1 to 6 a cylinder block 4, rigidly mounted on the following shaft 2, is provided with four radially disposed groups of cylinder bores 5a, 6a, 5b, 6b, in which corresponding pistons 7a, 8a, 7b, 8b are arranged to be reciprocated by the action of eccentrically mounted circular rings 9a, 10a, 9b, 10b with which they engage through ball bearing rollers 11 carried by pins 12 on extensions 13 of the said piston. The cylinders of each group lie in one plane and those in the groups 5 are angularly staggered relatively to those in the groups 6 as indicated in Figure 2. The rings 9a, 10a are carried by a member 14 rigidly mounted on the driving shaft 1 and form with the cylinders 5a, 6a and the pistons 7a, 8a the "pump" element of the gear while the rings 9b, 10b which are carried by the casing 3 form with the cylinders 5b, 6b and the pistons 7b, 8b the motor element of the gear.

It is evident that relative rotation of the driving shaft 1 and the cylinder block 4 carried by the following shaft 2 will cause the eccentric rings 9a, 10a to reciprocate the pistons 7a, 8a, while similarly reciprocation of the pistons 7b, 8b will, through the medium of the eccentric rings 9b, 10b, cause rotation of the cylinder block 4 and with it the following shaft 2.

Keep rings 15 disposed internally of the rollers 11 and engaging therewith maintain them in contact with the said eccentric rings. The member 14 and the cylinder block 4 are mounted on extensions 16 and 17 formed respectively on the driving and following shafts 1 and 2.

Means are provided for varying the eccentricity of the said eccentric rings, that for the rings 9a, 10a which are slidably mounted in the member 14 comprising a pair of levers 18 pivoted at 19 on opposite sides of the member and formed with surfaces 20 to engage the two eccentric rings 9a, 10a and interconnected by a member 21, being pivotably connected thereto at 22. A ring 23 arranged to be slidably moved along the extension 16 of the driving shaft 1 by operating levers 24 which, acting through pins 25 and a ball race 26, is connected at one side, as shown in the upper half of Figure 1, by a toggle link 27 to one side of the member 21, and, at the other side, as shown in the lower half of Figure 1, by a similar toggle link 27, to one end of a lever 28 pivotably mounted at 29 on the member 21. The other end of the said lever 28 is pivotably connected to the adjacent ring operating lever 18 at its point of connection 22 with the member 21. The arrangement thus provided ensures that operation of the levers 24 will positively displace the rings 9a, 10a in opposite directions from their positions of zero eccentricity as shown in Figure 1 so that they take up positions of eccentricity on opposite sides of their axis of rotation. The position of the toggle links corresponding to maximum eccentricity of the rings is indicated by the chain dotted lines in Figure 1. Similarly, the rings 9b, 10b are slidably mounted in the casing 3, but in this case the means for varying their eccentricity consists of a pair of spindles 30 journalled in the casing on opposite sides thereof and each carrying a pair of crank pins 31 each of which pins engages in a groove formed in one of the rings 9b, 10b so that rotation of the spindles 30 will impart opposite eccentric displacements to the said rings. The means for operating the rings 9a, 9b and the rings 10a, 10b are so connected by levers 32, links 33 and levers 34, connected by a spindle 35 with the levers 24, that one set of rings, e.g. 9a, 9b, is initially in a position of zero eccentricity while the other set is in a position of maximum eccentricity. Operation of the control mechanism will thus impart an eccentric displacement to one set of rings while progressively reducing that of the other set to zero.

The cylinder bores 5a, 6a are provided with non-return suction and delivery valves 36, 37 communicating with corresponding suction and delivery chambers or passages 38, 39, which passages also communicate with the cylinder bores 5b, 6b through ports 40, 41 formed in the cylinder block 4 and under the control of a rotary valve 43. This valve is formed with ports 44, 45 to correspond with the ports 40, 41 and is rotated at half the speed of the following shaft by an epicyclic train comprising a pair of planet pinions 46, 47 keyed together and journalled on a pin 48 carried on the cylinder block 4, one of which pinions 46 engages with teeth 49 formed on the said valve 43 while the other pinion 47 engages with teeth 50 formed on a member 51 carried by the casing 3. The member 51 is arranged to be partially rotatable about a portion 52 of the casing by longitudinal movement of a rod 53 which engages with the said member through a pin 54 and slot 55. Angular displacement thus imparted to the member 51 will be transmitted to the valve 43 and will have the effect of altering the relative timing of the ports 44, 45 in the valve and the ports 40, 41 in the cylinder block 4, by which means a reverse drive may be secured in a manner presently to be described.

A spring loaded non-return valve 56 is provided controlling an opening to the suction chamber 38, by which the circulating system may be replenished with working fluid to counteract the effect of leakage therefrom.

The gear operates as follows: The circulating system, i. e. the cylinders and delivery passages, etc., may first be assumed to be filled with a suitable working fluid, such as oil, and the driving shaft to be rotating with the corresponding rings (9$^a$, 10$^a$) in their positions of zero eccentricity, the rings 9$^b$, 10$^b$ then being in their positions of maximum eccentricity. This constitutes the "neutral" condition of the gear; there is no reciprocation of the pistons and no resulting rotation of the cylinder block and following shaft. If the control mechanism be now operated to impart some eccentricity to the rings 9$^a$, 10$^a$, the relative rotation of these rings (which are carried, as previously described, by the driving shaft) and the cylinder block will result in reciprocation of the "pump" pistons 7$^a$, 8$^a$, the amplitude of which reciprocation will depend upon the amount of the eccentricity of the said rings. Working fluid displaced by the "pump" pistons will pass through the discharge valves 37, delivery chambers 39, valve ports 45 and cylinder ports 41 to the motor cylinders 5$^b$, 6$^b$. It returns thence after having operated the pistons 7$^b$, 8$^b$ by way of the cylinder ports 40 and valve ports 44, the suction passage 38 and inlet valves 36 to the "pump" cylinders. The valve and cylinder ports are so arranged and the rotation of the valve so timed that a motor cylinder is put into communication with the delivery passage 39 just as its piston is commencing its outward stroke and is put into communication with the suction passage 38 just as the piston is commencing its inward stroke. Reciprocation of the motor pistons 7$^b$, 8$^b$ will result, by virtue of the eccentric rings 9$^b$, 10$^b$ with which they engage through the rollers 11, in rotation of the cylinder block 4, and with it the following shaft 2. The relative rotation, or the velocity ratio between the driving and following shafts, will depend on the relative eccentricities of the "pump" and "motor" rings, which eccentricities determine the amount of working fluid displaced by the reciprocating pistons. During initial operation of the control mechanism the eccentricity of the rings 9$^a$, 10$^a$ and the quantity of fluid displaced by their corresponding "pump" pistons is small. At the same time the eccentricity of the rings 9$^b$, 10$^b$ and the displacement of the corresponding motor pistons is large. In this condition, corresponding to a low gear, or to a large velocity ratio between the driving and following shafts, the driving shaft will evidently have to make several revolutions in order that the pump pistons may deliver enough working fluid to displace the motor through one revolution. Further operation of the control mechanism progressively diminishes the velocity ratio between the driving and following shafts, increasing the delivering capacity of the "pump" and decreasing the receiving capacity of the "motor" until, when the eccentricity of the "motor" discs 9$^b$, 10$^b$ is reduced to zero, the motor will be unable to receive working fluid and circulation thereof will cease. Reciprocation of the pump pistons and therefore relative motion between the driving shaft and cylinder block will be prevented and a direct drive will result. It may be noted that during operation of the control mechanism the circulation of the working fluid increases to a maximum when both sets of pistons are working at half their full stroke, corresponding to a velocity ratio of two, and thereafter decreases to zero in the direct drive condition.

Reverse drive is obtained, as previously mentioned, by operating the rod 53 to impart an angular displacement to the valve 43. This will effect an interchange of port operation, the valve now connecting a cylinder to the delivery chamber at the point where previously it was connected to the suction chamber, and vice versa, so that a reverse drive will result.

Referring to the form of gear illustrated in Figures 7 to 14, cylinder blocks 4$^a$, 4$^b$ rigidly secured to a flange 17 formed integrally with the following shaft 2 are provided with four radially disposed groups of cylinder bores 5$^a$, 6$^a$, 5$^b$, 6$^b$ in which corresponding pistons 7$^a$, 8$^a$, 7$^b$, 8$^b$ are arranged to be reciprocated by eccentrically mounted circular rings 9$^a$, 10$^a$ carried by a member 14 attached to the driving shaft 1 and rings 9$^b$, 10$^b$ carried by the casing 3 with which they engage through connecting rods 57.

The connecting rods 57 are provided with ball bearing rollers 11 which engage the said eccentric rings and are formed with annularly extending slippers 58 which engage with the back of keep rings 15 so as to maintain the rollers 11 in contact with the said eccentric rings. The member 14 is secured to a flange 16 formed on the driving shaft 1.

Means are provided for varying the eccentricity of the said eccentric rings, that for the rings 9$^a$, 10$^a$ which are slidably mounted on the member 14 comprising a cam member 60 arranged to slide axially on a portion 61 of the member 14 and formed with cam surfaces 62, 63 to engage the said rings through the medium of balls 64. Similarly the means to vary the eccentricities of the rings 9$^b$, 10$^b$ comprises a pair of spindles 65 journalled in the casing on opposite sides thereof and carrying eccentrics 66 which engage with the said rings. Discs 67 formed integrally with the spindles 65 carry pins 68 which engage with radial slots 69 formed to be mutually at right angles in the discs 70 which are carried by spindles 71 journalled in the casing. Opposite discs 70 are interconnected by links 72, one of which links is slotted at 73 to receive the crank pin 74 of a lever 75 which is carried by an operating spindle 76 journalled in the casing. Operational rotation of the spindle 76 effects eccentric movement of the discs 9$^b$, 10$^b$ through the medium of the pin 74 and slot 73 the slotted discs 70 and pins 68 and the eccentrics 66, the slotted discs 70 and pins 68 serving in a well known manner to double the angular movement transmitted from the spindles 71 to the spindles 65. An external operating lever 77 secured to the spindle 76 is connected also to the means for adjusting the discs 9$^a$, 10$^a$ through a link 78, a lever 79, a spindle 80 and levers 81 which engage with the slidable cam member 60 through a ring 82 pivoted to the said levers and engaging the member in a slot 83. The control mechanism above described is so arranged that one set of eccentric discs will be in a position of zero eccentricity while the other set is in a position of maximum eccentricity.

The cylinders 5$^a$, 6$^a$, 5$^b$, 6$^b$ are provided with outlet and inlet ports 40, 41 under the control of ports 44, 45 formed in valves 43$^a$, 43$^b$, which valves are attached respectively to the driving shaft 1 and to a rotatable member 84 which is formed with teeth 85 to engage a toothed quadrant 86 carried by a spindle 87 which is journalled in the casing. This latter spindle may be rotated by an operating lever 88 in order to secure reverse drive by alteration of the timing of the ports in the valve 43$^b$. The ports in the cylinders 5$^a$, 6$^a$, 5$^b$, 6$^b$ are interconnected by suction and delivery passages 38, 39.

The gear illustrated in Figures 7 to 14 operates as follows:—

Figure 7:
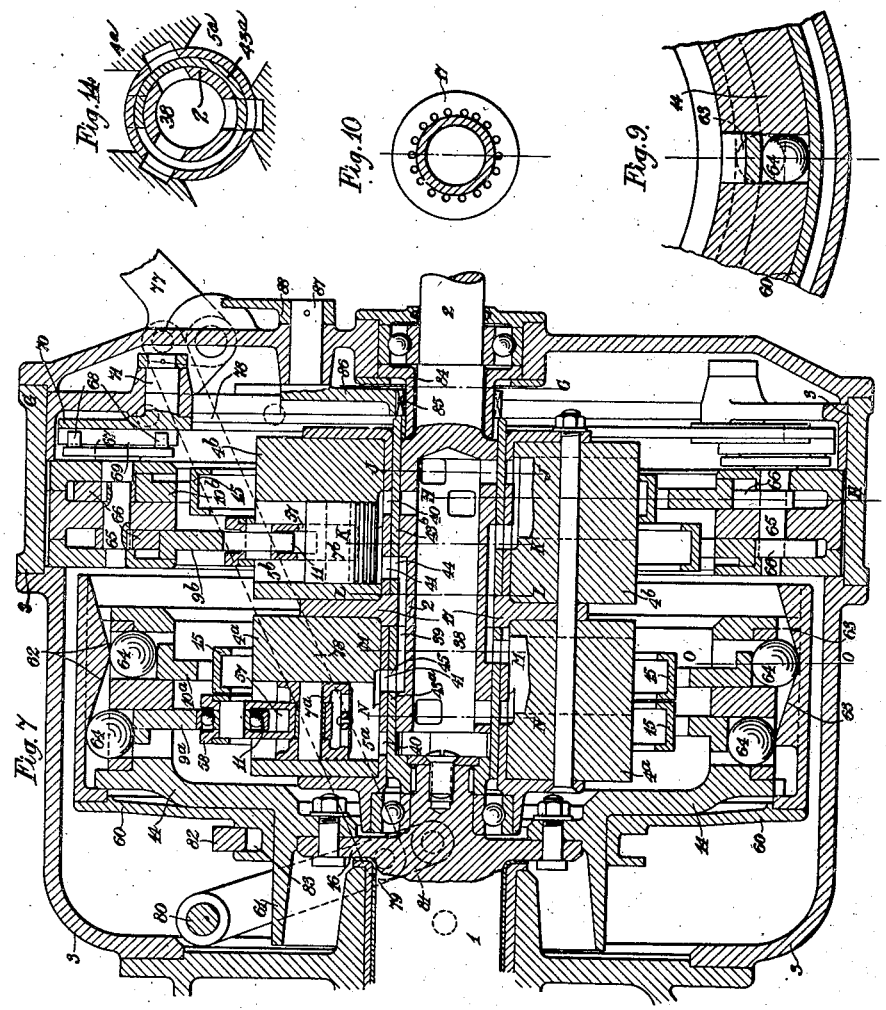
Figure 7 is a sectional side elevation of another form of gear in accordance with the invention taken on the line F—F of Figure 8.
Figure 8:
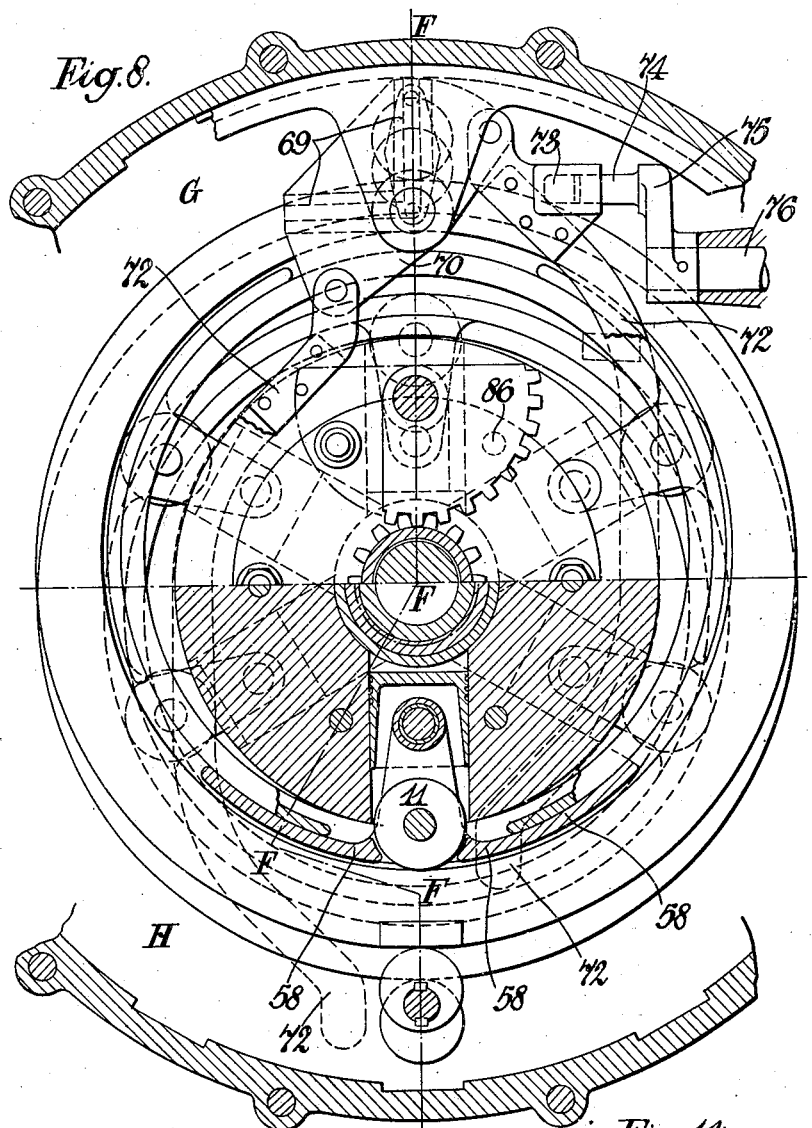
Figure 8 is a part sectional end elevation of the gear, of which the portions G, H represent sections taken respectively on the lines G—G and H—H of Figure 7.
Figure 13:
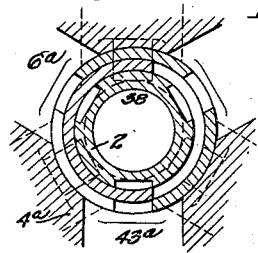
Figure 12:
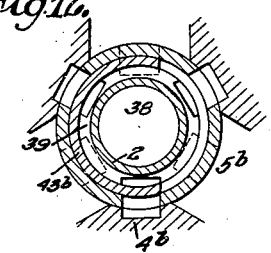
Figure 11:
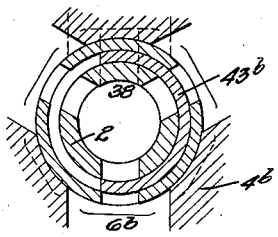

In the position shown in Figure 7 the rings 9$^a$ and 10$^a$ are concentric and may rotate freely without actuating their relative pistons thus providing a neutral condition; the other discs 9$^b$ and 10$^b$ then have maximum eccentricity.

When the rings 9$^a$ and 10$^a$ are adjusted to maximum eccentricity the discs 9$^b$ and 10$^b$ are simultaneously reduced to concentricity; thus the pistons actuated by these rings can have no travel and receive no working fluid, this condition constituting a hydraulically locked system and consequently a direct through drive.

When the rings 9$^a$ and 10$^a$ have relatively small adjustment and their relative pistons have correspondingly small stroke, the rings 9$^b$ and 10$^b$ have relatively large eccentricity and their relative pistons have correspondingly large travel. In operation, fluid under pressure is delivered through the ports 41 and pressure chamber 39, the ports 41 being so arranged and timed as to communicate with the cylinders 5$^a$, 6$^a$ during the inward strokes of the pistons 7$^a$, 8$^a$, and with the cylinders 5$^b$, 6$^b$ during the outward strokes of the pistons 7$^b$, 8$^b$. The return flow of the fluid at normal pressure is via the ports 40 and low pressure chamber 38, the arrangement and timing of the openings being the reverse of that already described.

Thus, the first set of cylinders constitutes a fluid pressure pump and the latter set a fluid pressure motor driven from the pump, and it will be noted that the torque reaction of the pump is delivered to the following shaft in addition to the torque of the motor. Further, in the condition under consideration the pump delivery is small whilst the receiving capacity of the motor is large and a correspondingly large number of revolutions of the driving rings 9$^a$, 10$^a$ will be necessary to complete one revolution of the pump, thus giving a high velocity ratio. Also, as the eccentricity of the driver is small the fluid pressure will be relatively high and as this is acting at a large eccentricity, a correspondingly high torque will be delivered by the motor. This torque augmentation corresponds to the high velocity referred to.

The velocity ratio and torque augmentation will both reduce towards unity as the first rings 9$^a$, 10$^a$ are further adjusted, this having the effect of increasing the capacity of the pump to discharge and the capacity of the motor to receive.

Rotation of the quadrant 86 is so arranged as to turn the sleeve 43$^b$ through one half a revolution and thus bring all the ports formerly in communication with the high pressure chamber into communication with the low pressure chamber and those formerly communicating with the low pressure chamber now in communication with the high pressure chamber. As the sleeve 43$^b$ serves the pump only this has the effect of reversing the direction of circulation of fluid in the pump only and thus reverses the direction of rotation of the pump and following shaft.

Referring to the form of gear illustrated in Figures 15 to 18, a pair of adjustable rings 9$^a$, 10$^a$ is attached by a member 14 to a flange 16 formed integrally with the driving shaft 1 whilst the second pair 9$^b$, 10$^b$ is attached to a fixed part 89 supported from the casing 3 and the said rings 9$^a$, 10$^a$ and 9$^b$, 10$^b$ are keyed at 125$^a$ (Figure 16) to the member 14 and the part 89, respectively. The adjustment of each pair is the same and consists of an outer sliding sleeve made in two parts 90 and 91, which are connected to each other by a double purpose ball thrust bearing 92. This or an equivalent means is necessary since the sleeve 90 always rotates with the driving shaft 1, whilst the sleeve 91 remains stationary. Each sleeve is fitted with small cylindrical bushes 93, there being four pairs of such bushes in this arrangement, and these are drilled perpendicularly to their axes to receive pin lever arms 94 which are attached to and operate spindles 95. The latter carry cam pins 96 similar in principle to worm teeth and these engage worm wheel teeth or cam slots 97 formed in the eccentric rings 9$^a$, 10$^a$, 9$^b$, 10$^b$. Thus axial displacement of the sleeves 90, 91 will cause the levers 94 to turn and thus move the said eccentric rings radially, so adjusting their eccentricity. This adjustment is controlled by a sleeve 98 slidably mounted on a portion 99 of the casing 3 and levers 100 having pins 101 which engage slots 102 therein. The sleeve 98 is connected by a flange 103 and rods 104 to the sleeves 91.

Figure 15:
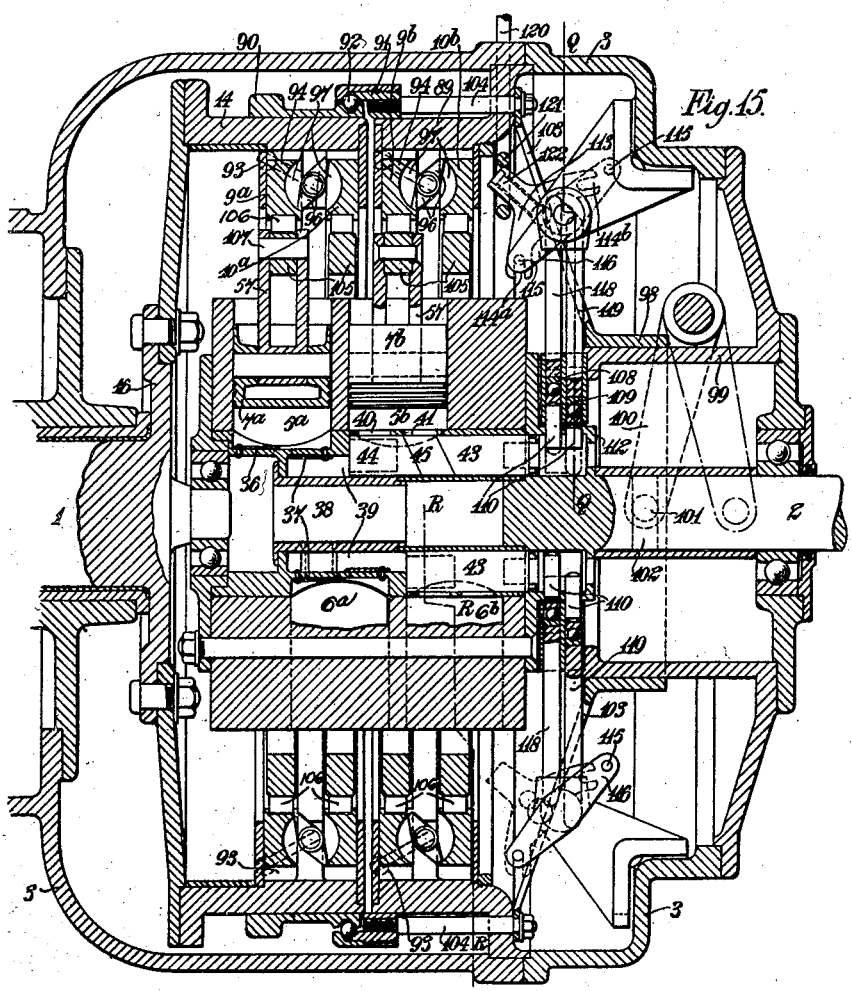
Figure 15 is a sectional side elevation of a further form of gear in accordance with the invention taken on the line P—P of Figure 16.

Pistons 7$^a$, 8$^a$, 7$^b$, 8$^b$ are actuated by connecting rods 57 pivotally attached to rings 105 which are rotatably mounted within the eccentric rings 9$^a$, 10$^a$, 9$^b$, 10$^b$ by rollers 106. One connecting rod 57$^a$ in each set is securely attached to a ring 105, thus forming a master rod whilst the remaining rods are connected by wrist pins 107 becoming subsidiary rods. The pistons work in four groups 5$^a$, 6$^a$, 5$^b$, 6$^b$ of bores formed in a cylinder block 4, the bores in each group lying in one plane, while those in groups 5 are angularly staggered relatively to those in group 6. Suction and delivery passage chambers 38, 39 respectively are formed within the core of the cylinder block and non-return suction and delivery valves 36, 37 serve to admit fluid from the low pressure and to the high pressure chambers respectively. The distributon of the working fluid to the motor cylinders 5$^b$, 6$^b$ is effected by means of valves 43, one being provided for each cylinder and these valves are provided with flats (see Figure 16) which provide communication with the low pressure chamber 38. Each valve is formed with ports 44, 45 to co-operate with ports 40, 41 with which the cylinders are provided. The necessary oscillatory motion of these valves for opening and closing communication and the timing of same is effected by two eccentric rings 108, 109, and tappets 110 co-operating with flats 111 formed on the valves, the latter passing through flange 112 formed on the following shaft 2 to which the cylinder block is attached. The travel or motion of these valves is initially a maximum and is gradually reduced to zero as the eccentricity of the pump rings 9$^a$, 10$^a$ is increased to a maximum and that of the "motor" rings 9$^b$, 10$^b$ reduced to zero. This is effected by quadrants 113, which are pivotably mounted upon and move with the flange 103 of the sleeve 98, these quadrants being provided with slots 114$^a$, 114$^b$ which engage pins 115 in levers 116 pivoted to the casing and so turn the said levers as they move with the sleeve 98 as indicated in Figure 17. The levers 116 in turn operate flats or cams 117 thus radially displacing spindles 118, 119 to which the eccentric rings 108, 109 are attached. By depressing a rod 120 a stirrup 121 on this rod, engaging a quadrant 113, causes the latter to turn and the initially inoperative slots 114ᵇ now engage the initially inoperative pins 115 on the levers 116. The motion so imparted is such as to reverse the position of the eccentric rings 108, 109, and thus the corresponding valve operation. This condition is indicated in Figure 18 and the functioning will now produce reverse drive on the following shaft 2, the valve cycle having been turned through 180° so that the pump pistons, which previously were on the inward or exhausting stroke, now communicate with the high pressure chamber and are thereby forced outwards, reversing the direction of rotation of the cylinder block and following shaft. The quadrants 113 are provided with spring plungers 122 engaging with recesses in their pivot pins to restrain said quadrants in one of two angular positions corresponding to forward and reverse drive. The said quadrants can only be displaced from one of these positions to the other by means of the stirrup rod 120 when the gear is in its neutral condition as shown in Figure 15. The system here illustrated is open and requires fluid to surround the mechanism in the casing. The enclosed system can of course be readily adopted as in previous examples.

The gear illustrated in Figure 15 to 18 operates as follows:—

The mechanism in the position shown in Figure 15 is in neutral condition, the actuating rings 9ᵃ, 10ᵃ on the driving shaft having zero eccentricity whilst those 9ᵇ, 10ᵇ on the following shaft have maximum eccentricity. In this condition the driving shaft may rotate freely, there being no resistance from the pistons 7ᵃ, 8ᵃ.

Direct drive is again obtained by giving the rings 9ᵃ, 10ᵃ maximum eccentricity whilst rings 9ᵇ, 10ᵇ are reduced to a position of concentricity. The pistons 7ᵇ, 8ᵇ now rotate without radial displacement, thus forming a locked hydraulic system.

At any position between these extreme conditions both pairs of rings have some eccentricity, according to the position, and rotation of the first pair 9ᵃ, 10ᵃ causes a corresponding displacement of the pistons 7ᵃ, 8ᵃ and of the working fluid. The latter is delivered under pressure, on the inward stroke, through the non-return valves 37 to the high pressure chamber 39 and returns through the suction valves 36 from the low pressure chamber on the return or outward stroke. From the high pressure chamber the fluid may pass to the cylinders 5ᵇ and 6ᵇ via ports 44 in the rotary valves 43. These ports are arranged and the valves timed and operated through the eccentrics 108, 109 and tappets 110 so that opening is made during the outward movement of the pistons when the fluid pressure acting upon these pistons and through the connecting rods reacting upon the rings 9ᵇ, 10ᵇ drives the cylinder block and following shaft 2 as in an ordinary reciprocating engine.

The exhaust fluid from cylinders 5ᵇ, 6ᵇ passes through ports 45, formed by the flats upon the rotary valves 43, returning to the low pressure chamber 38. The timing of these ports is arranged so that opening is made during the inward stroke of the pistons.

The combination thus forms a variable pump operated from the driven shaft directly coupled and delivering working fluid to a fluid pressure motor. Further, the combination is so arranged that as the capacity of the pump is increased from zero to a maximum the capacity of the motor is correspondingly reduced from a maximum to zero.

When the adjustment is such that the pump capacity is relatively low and that of the motor high, the pump must make correspondingly more revolutions than the motor in order to maintain the necessary delivery rate, thus obtaining a high velocity ratio and correspondingly high torque augmentation.

As the adjustment of the pump delivery increases by further adjustment of the rings 9ᵃ, 10ᵃ and that of the receiving capacity of the motor decreases the speed of the motor will accordingly increase relative to the pump drive steadily approaching a velocity ratio and torque augmentation of unity.

In order to reverse the direction of the motor it is necessary to reverse the direction of fluid circulation therein and this is effected by the mechanism, already described, whereby the eccentrics 108, 109 are transposed in relation to radial displacement and thus a valve port will start opening at the point where formerly it finished closing.

Figure 19:
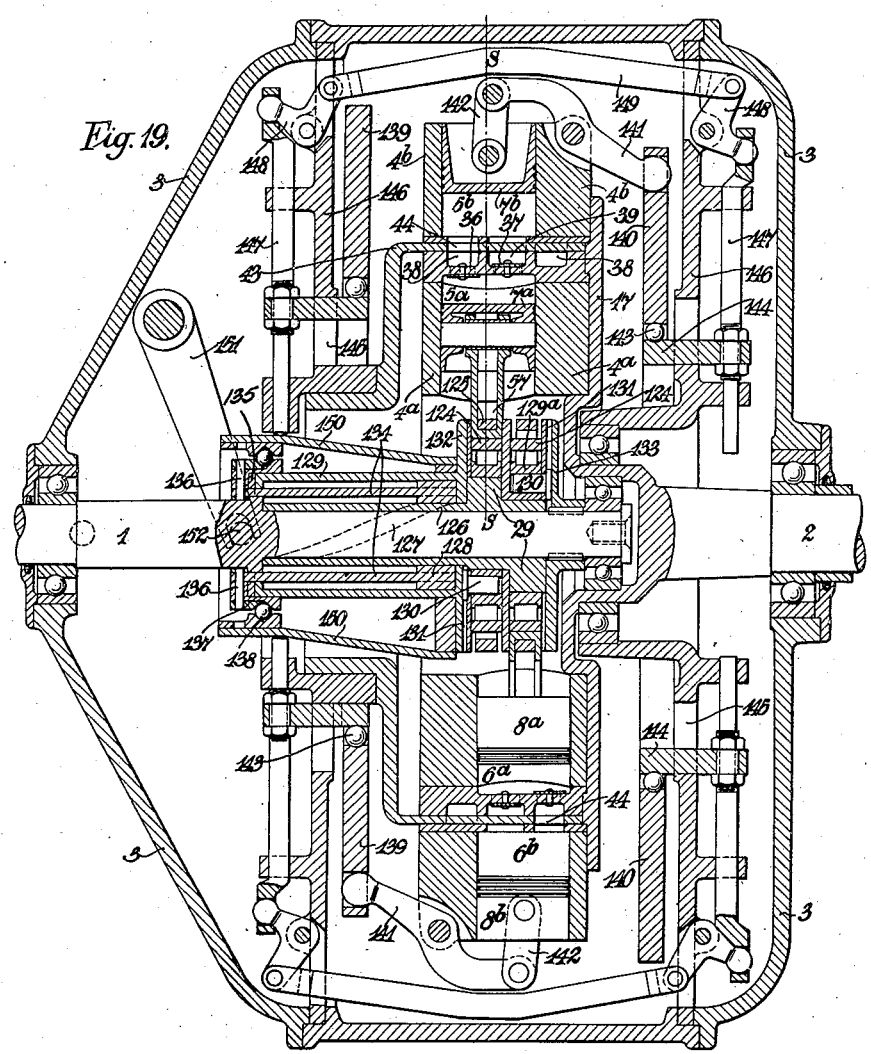
Figure 19 is a sectional side elevation of still a further form of gear in accordance with the invention.
Figure 20:
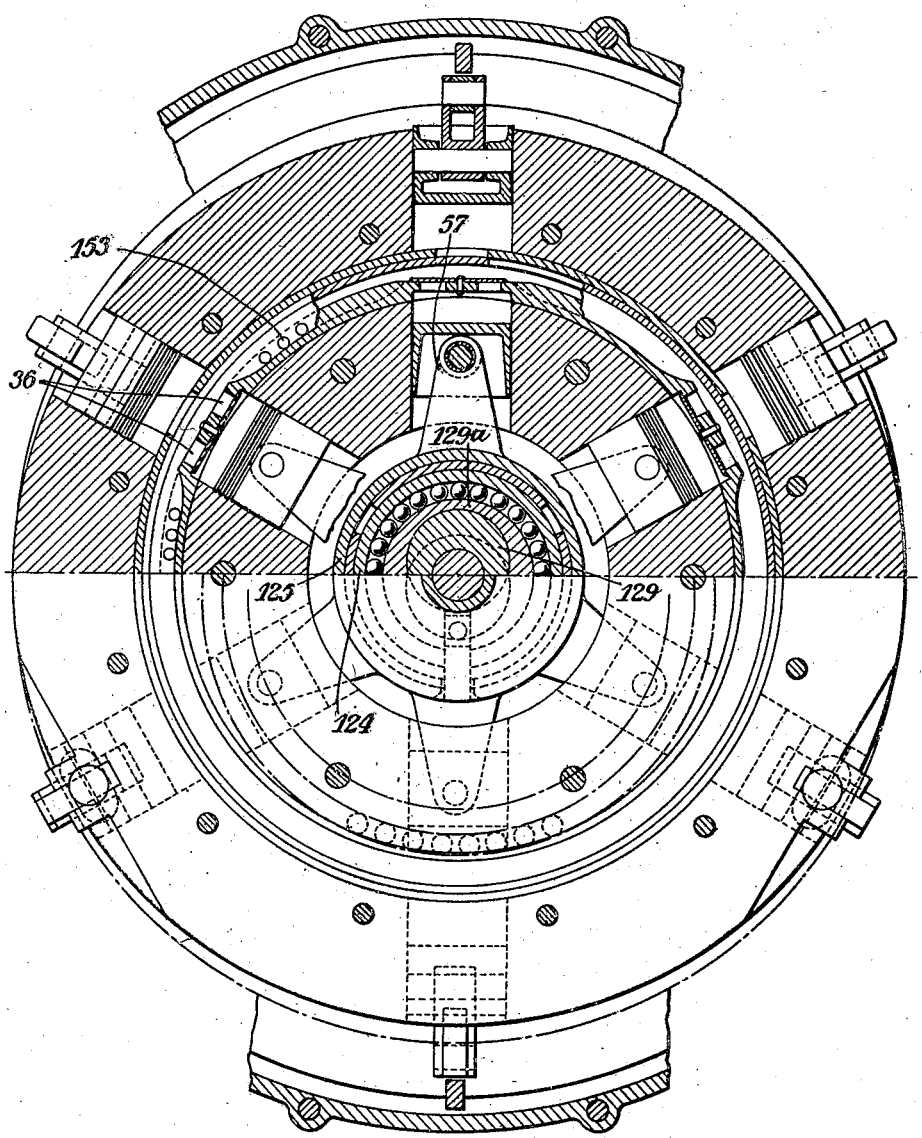
Figure 20 is a part sectional end elevation of the gear of which the upper half is a section taken on the line S—S of Figure 19 and the lower half is an end elevation of the mechanism with the rear cover plate and shaft removed.

Referring to the form of gear illustrated in Figures 19 and 20, two sets of cylinders 5ᵃ, 6ᵃ, 5ᵇ, 6ᵇ, members of each set being arranged to be radially in line with corresponding members of the other set, are formed in cylinder blocks 4ᵃ, 4ᵇ attached to the following shaft 2, by a flange 17 formed on the said shaft. An annular space provided betwen the outer and inner diameters of the blocks 4ᵃ, 4ᵇ accommodates suction and delivery passages 38, 39 and fluid circulation, control valves and ports. Inner sets of pistons 7ᵃ, 8ᵃ are actuated from discs 124, connecting rods 57 being connected alternately with the pistons 7ᵃ, 8ᵃ and their respective discs. The said discs are preferably mounted upon roller bearings and the connecting rods retained by circlets or keep rings 125. In order that only one keep ring may suffice for each set, the connecting rods may be slotted centrally as illustrated in Figure 19. The adjustment of these discs is effected by means of an eccentric sleeve 126, freely mounted upon the driving shaft 1. This sleeve is provided with helical grooves 127, with which a nut 128 engages, the said nut further engaging axial slots formed in a member 129 secured to the driving shaft 1. Thus, axial movement of the nut 128 produces rotary motion of the sleeve 126 and eccentrics 29 formed therewith relative to the shaft 1, the said eccentrics imparting the necessary radial adjustment to discs 129ᵃ. Rotation of the said discs relative to shaft 1 is prevented by pins 130 attached to the discs and engaging radial slots 131 in flanges 132, 133, which flanges are respectively formed on the member 129 and secured to the driving shaft 1, the member 129 being secured to the driving shaft through the medium of a flange 135 on the latter, being secured to this flange by keys or castellations. Sliding control of the nut 128 is externally applied by rods 134 attached thereto and extending through the flange 135 in the shaft 1, and secured by pins 136 to the inner member 137 of a double thrust combination ball bearing 138. Outer sets of pistons 7ᵇ, 8ᵇ are reciprocated by discs 139, 140 through the medium of ball ended levers 141 and connecting rods 142, the former being pivoted to the cylinder block 4ᵇ. The pistons 7ᵇ, 8ᵇ are alternately thus connected to the discs 139, 140. The latter are mounted by ball bearings 143 on cylindrical members 144 and these members are mounted in slides 145 formed in members 146 attached to the casing. These are eccentrically adjustable by push rods 147, which are cross connected by bell cranks 148 and links 149. The control of the adjustment is by cam 150 engaging the ends of the push rods 147 and attached to the outer sleeve of the ball race 138. Thus the control of the two sets of adjustable discs and therefore piston stroke is simultaneous and such that as the first pair is adjusted from zero to maximum eccentricity, the latter reduces from maximum to zero eccentricity, axial movement of the cam 150 is effected by levers 151 engaging therewith through pins 152.

Suction and delivery chambers 38, 39 respectively are provided in the annular space between the cylinder blocks 4$^a$, 4$^b$ as shown. In this arrangement it is convenient to divide the suction chamber 38 and interpose the delivery chamber, the two sections of the low pressure chamber being interconnected by ports 153 as shown in Figure 20. Delivery and return of the working fluid to and from their respective ports is controlled by non-return valves 37, 36, communicating with the cylinders 5$^a$, 6$^a$. The distribution of the fluid to and from the outer cylinders 5$^b$, 6$^b$ is controlled by suitably shaped and disposed ports 44, 45 formed in an interposed sleeve 43, which is attached to the casing 3, the said sleeve 43 being mounted, as is clearly shown in Figure 19, by a central hollow boss in a corresponding hub portion on the left-hand member 146 which latter is secured to the casing 3. Reverse functioning and thus drive may be obtained by giving sleeve 43, one half turn, thus bringing opposite sets of ports into communication with those in the outer cylinders 5$^b$, 6$^b$.

The gear illustrated in Figures 19 to 20 operates as follows:—

The adjustable discs as shown in Figure 19 are set at zero eccentricity whilst the adjustable discs 139, 140, attached to the casing, are set at maximum eccentricity. Since the discs 124 are on the driving shaft 1, no motion can be imparted to the pistons 7$^a$, 8$^a$ and a neutral condition is thus obtained.

As adjustment is given to these discs 124, giving them an eccentricity increasing from zero to a maximum, the discs 139, 140 are simultaneously reduced from a maximum to zero eccentricity and in the latter condition no fluid can be circulated through the cylinders 5$^b$, 6$^b$. This forms a locked hydraulic system and provides a through or direct drive.

At any intermediate position the discs 124 actuate, through the connecting rods 57, the pistons 7$^a$, 8$^a$ and thus effect displacement of fluid. On the outward strokes of the pistons fluid under pressure passes through the delivery valves 37 into the high pressure annular chamber 39 and return fluid on the inward stroke passes from a low pressure annular chamber 38 via the suction valves 36.

From the high pressure chamber 39, fluid may pass to and operate pistons 7$^b$, 8$^b$ via ports formed in a sleeve 43 situated between the pressure chambers and inner ends of cylinders 5$^b$, 6$^b$. Exhaust fluid from these cylinders returns to the low pressure chambers 38 via another set of ports 44 formed in sleeve 43. The ports are arranged and timed so that the cylinders 5$^b$, 6$^b$ communicate with the high pressure chamber 39 during the filling or outward stroke whilst communication with the low pressure chamber 38 is made during the exhaust or inward stroke. The inner system operated from the driving shaft 1 is thus a variable pressure delivery pump whilst the outer system which reacts against a stationary part constitutes a variable reception motor. At low strokes or low capacity deliveries the motor has high receiving capacity necessitating a relatively higher driving speed to maintain delivery thus giving a high velocity ratio and torque augmentation.

As the eccentricity of the drive or pumping capacity is steadily increased and the receiving capacity of the motor is correspondingly decreased the relative speed drop will accordingly decrease and the velocity ratio and torque augmentation progressively diminish towards unity.

Referring to the form of gear illustrated in Figures 21 to 25 same differs from previous forms essentially in that tilting or swash plates are employed to reciprocate the pistons. The driving shaft 1 carries the first pair of tilting plates 154$^a$, 155$^a$ upon coaxial radially disposed trunnions 156. These plates are adjustable thereupon by contact with sliding cams 157 controllable by suitable means such as a collar 158 and lever 159. Tilting rings 160$^a$, 161$^a$ carried by the plate 154$^a$, 155$^a$ in suitable bearings, as shown, carry alternately the ends of connecting rods 162 universally attached thereto. The rings 160$^a$, 161$^a$ are further attached universally to each other and to a cylinder block 4 by the medium of gimbal rings 163$^a$, 164$^a$ and gimbal pins 165$^a$, 166$^a$, 167$^a$.

The second pair of tilting plates 154$^b$, 155$^b$ is attached to a stationary part such as the extension 168 of the casing 3 in an adjustable manner similar to the described method of attaching the first pair of tilting plates. The control of these plates can also be effected in like manner although in this instance cams 169 are formed for convenience upon a sleeve 170 the control of which is rotary, this rotary control being obtained in any convenient manner, such as that shown in Figure 23, in which a rack 171 engages a pinion 172 formed upon or attached to the sleeve. This rack may be formed upon, or attached to, a cross spindle 173 from which the displacement and desired control is obtained. The spindle 173 is further interconnected through the medium of a lever 174 and link 175 to a main control lever 176 which latter is connected to and operates the previously-mentioned lever 159 and collar 158. The combined control is contrived so that initially the first pair of tilting plates and rings are coplanar being normal to the main axis of rotation while the second pair have their maximum angular displacements or tilts oppositely disposed, also that as the control is operated giving the first pair opposite tilts increasing to a maximum, the tilts of the second pair correspondingly decrease to zero.

The cylinder block 4 previously mentioned is provided with axially disposed bores 5$^a$, 5$^b$ accommodating respective pistons 7$^a$, 7$^b$ and is attached to the following shaft 2. The pistons 7$^a$, 7$^b$ are universally connected by the rods 162 to the aforementioned tilting rings through which they are actuated.

A gap may be provided in the cylinder block 4 between the ends of the cylinders 5$^a$, 5$^b$ to accommodate suction and delivery chambers 38, 39 and fluid control mechanism.

Figure 22:
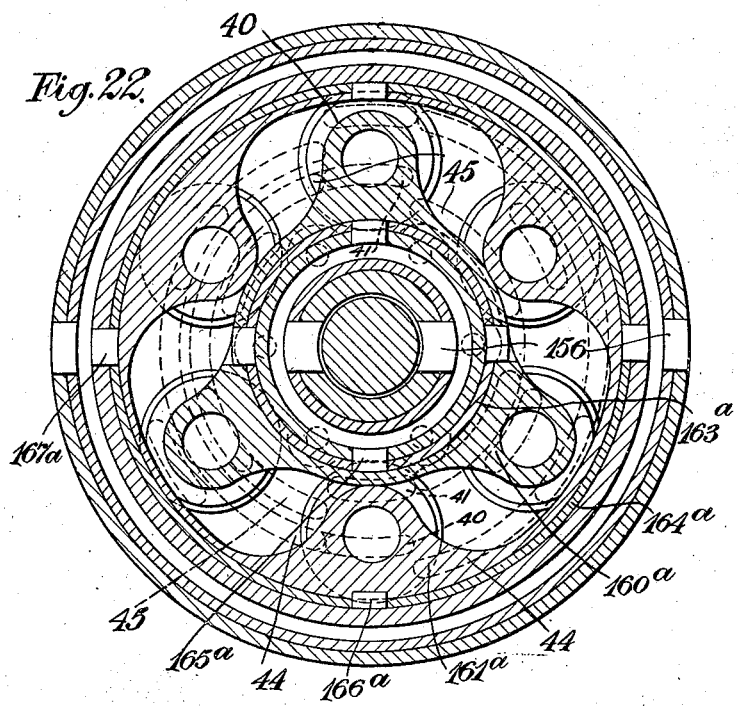
Figure 22 is a sectional end elevation of the gear taken on the line T—T of Figure 21 with the tilting members thereof adjusted to the position of zero tilt.
Figure 23:
Figure 23 illustrates part of the control mechanism.
Figure 25:
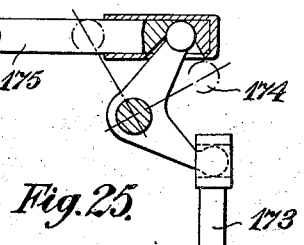
Figures 24 and 25 are part sectional plans of other parts of the control mechanism.
Figure 24:
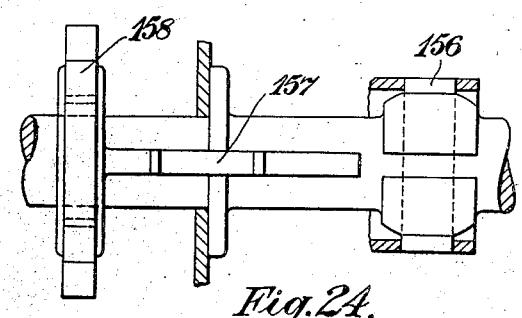

The annular suction and delivery chambers 38, 39 communicate with the cylinders 5$^a$ by non-return suction and delivery valves 36, 37, respectively. The system, as illustrated, is closed and therefore a non-return supply valve 56 is provided although the system may be open, if desired. The distribution and further control of the fluid circulation is by means of an intermediate disc or plate valve 443 provided with appropriate segmental ports 44, 45 registering with corresponding ports 40, 41 formed at the ends of the cylinders 5$^b$, the arrangement being such that free communication between the delivery chamber 39 and the motor cylinders 5$^b$ is made during the outward motion of the pistons 7$^b$ while the suction chamber 38 is open during the return or inward motion of the pistons 7$^b$. Since in each of the two series of cylinders the pistons are alternately connected and diametrically opposite pistons thus have the same relative motions over each cycle or revolution, two sets of alternately disposed valve ports 44, 45 are necessary and also two sets of corresponding high and low pressure cylinder ports 40, 41, as indicated in Figure 22.

One half turn of the valve disc 43 has the effect of bringing the ports into opposite location thus providing reverse functioning and consequent reverse rotation of the following shaft 2. This rotation may be readily obtained by means of a bevel pinion 177 engaging teeth 178 formed in the valve plate 43.

The operation of the gear illustrated in Figures 21 to 25 is as follows:—

Figure 21:
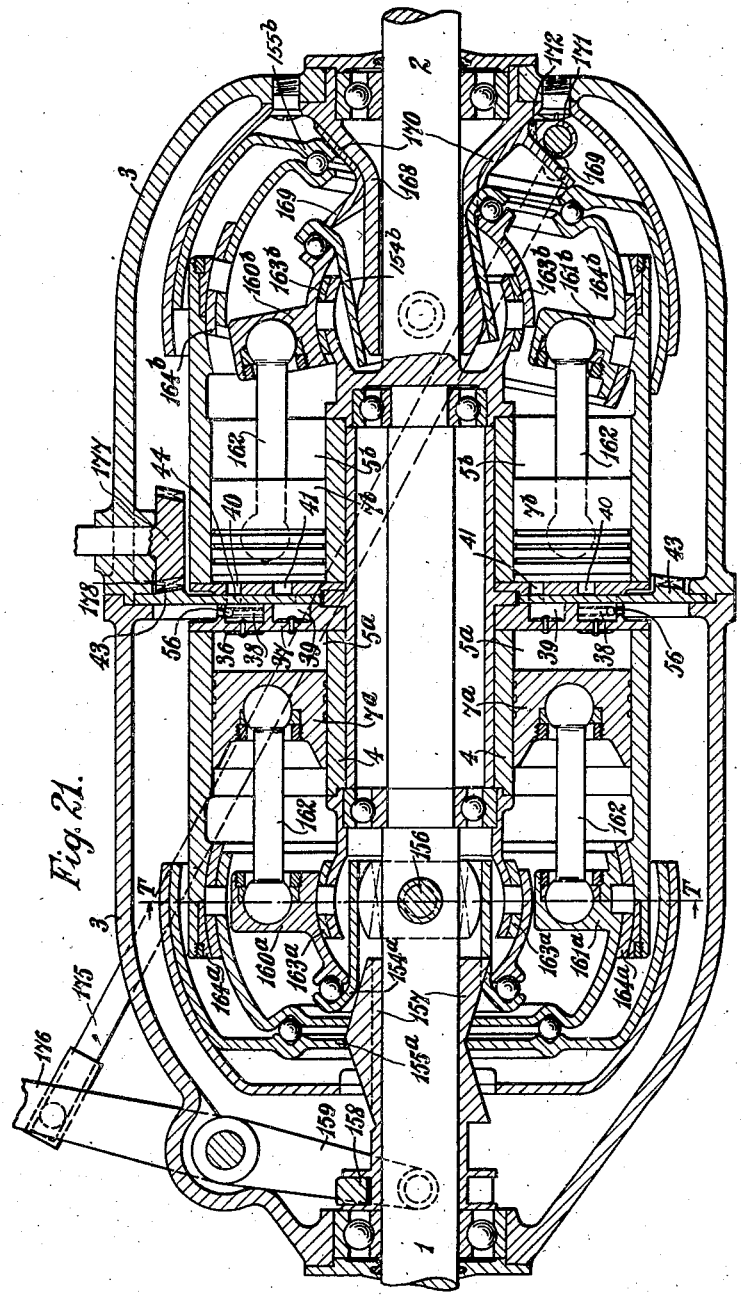
Figure 21 is a sectional side elevation of still a further form of gear in accordance with the invention.

The adjustable actuating plates 154$^a$ and 155$^a$, driven from the main input shaft, are in the position shown in Figure 21 at zero tilt whilst the adjustable actuating plates 154$^b$ and 155$^b$, attached to a stationary part, are in the position of maximum tilt. This corresponds to a neutral condition of the mechanism since any rotation of the driving shaft imparts no axial motion to the pistons 7$^a$ and therefore meets with no resistance.

If the control is operated effecting adjustment of the actuating plates 154$^a$ and 155$^a$, same receive angular displacement or tilt in opposite directions, increasing with the actuation of the control mechanism from zero to maximum tilt whilst the simultaneous effect on plates 154$^b$ and 155$^b$ is to reduce the tilt thereof from maximum to zero. The latter condition is that of direct drive since circulation of the working fluid is not possible under this condition, a locked hydraulic system being provided in this way.

At any intermediate condition of the mechanism, rotation of the shaft 1 and tilted plates 154$^a$ and 155$^a$ actuates the pistons 7$^a$ through the medium of the bearing rings 160$^a$ and 161$^a$ and connecting rods 162, the displacement of the pistons giving rise to fluid circulation. Thus, the pistons moving inwards discharge working fluid under pressure via the delivery valves 37 to the pressure chamber 39 whilst those on the return or outward stroke refill through the suction valves 36 from the exhaust or return flow chamber. The action of this part is thus that of a variable pump. Fluid in the pressure chamber 39 passes through the ports 45 of the intermediate plate 43 to the cylinders 5$^b$, the arrangement and timing being such that they are open during the outward travel of the pistons 7$^b$ and closed during the inward stroke. During the latter phase the set of ports 44 in the plate 43 gives open communication with the exhaust chamber 38 so that this part of the mechanism operates as a variable fluid pressure motor delivering its torque, over and above the reactionary torque of the pump end, to the following or output shaft 2.

When the adjustment of the pump end is relatively small its delivery is likewise small whilst that of the motor is relatively large necessitating a higher pump speed to meet this requirement. Moreover, the pressure of the working fluid is relatively high giving rise to a correspondingly high motor torque. This condition thus provides a high velocity ratio and torque augmentation.

As the pump adjustment increases to a maximum and the motor adjustment decreases to zero, the pump delivery capacity increases and the receiving capacity of the motor decreases to zero; consequently the velocity ratio and torque augmentation decrease to unity in the process.

Reverse drive is obtained by reversing the circulation of fluid in the motor end. This is effected by rotating the intermediate plate 43 through one half turn, thus bringing the ports 44 and 45 into a position diametrically opposite to that shown in Figure 22. In this new condition the ports which were open to the receiving cylinders are now open to the exhausting cylinders at the motor end and the direction of drive will therefore be opposite to that which previously existed.

Figure 27:
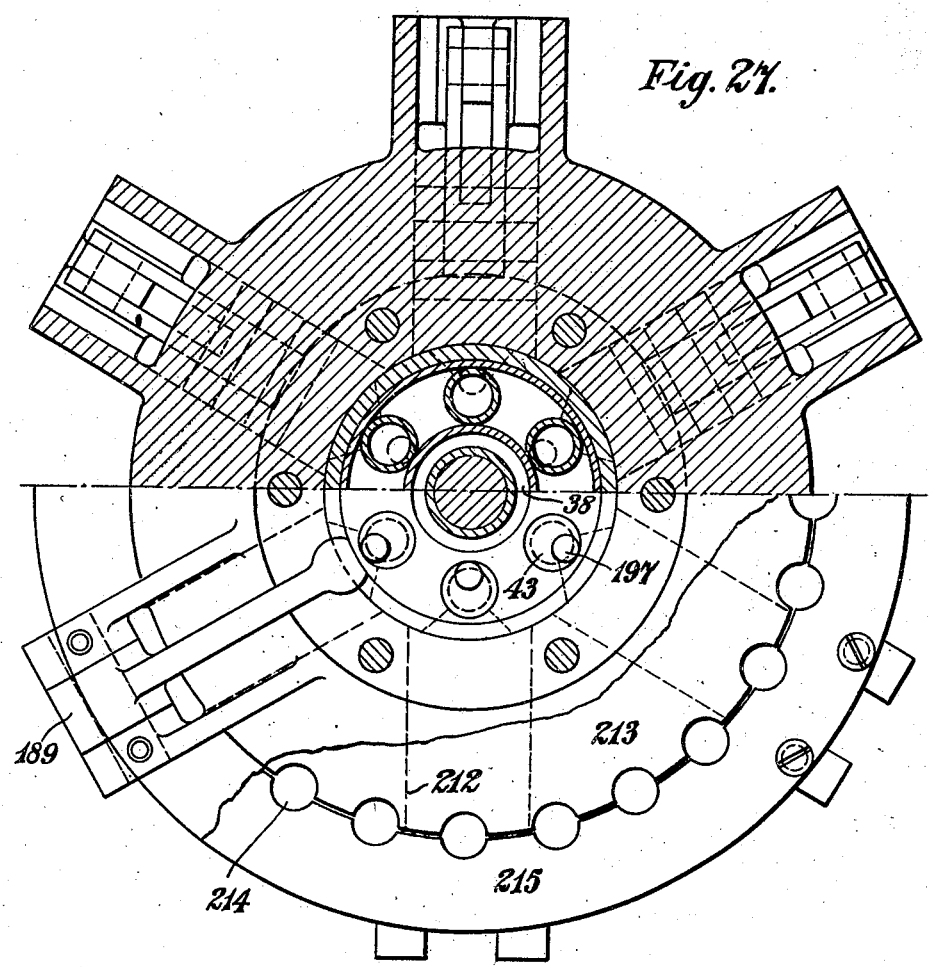
Figure 27 is a part sectional end elevation of the gear of which the upper half is a section taken on the line U—U of Figure 26 and the lower half is a partial end view of the mechanism with the rear cover plate removed.
Figure 28:
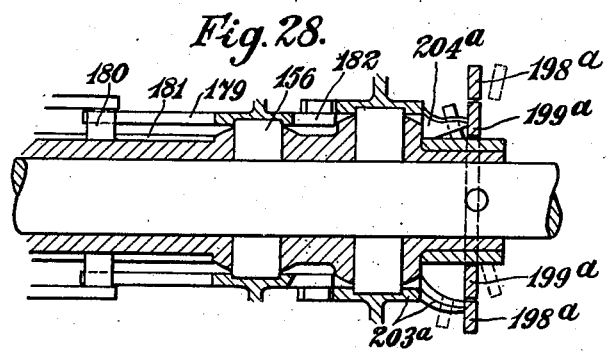
Figure 28 is a sectional plan of part of the control mechanism.

Referring to the form of gear illustrated in Figures 26 to 28 same differs from the preceding forms of gear principally in the means employed to reciprocate the pistons and the method of obtaining reverse, the latter being effective over the whole speed range, if desired. Reciprocation of pistons 7$^a$, 7$^b$ is effected by two tilting plates or discs 154$^a$, 155$^a$ adjustably mounted upon the driving shaft 1 by pivots or trunnions 156$^a$.

With the actuating mechanism here shown it is possible to displace the trunnions 156$^a$ from one another so that they are not coaxial and advantage may be taken of this, as illustrated in Figure 26, to interconnect the adjustment. Thus the first tilting plate 154$^a$ is provided with inclined cam slots 179 and axially slidable pins 180 engaging these slots and constrained by axial slots 181 in the shaft 1 provide the necessary control of the first tilting plate while this is oppositely transmitted to the second tilting plate 155$^a$ through the medium of the interconnecting pins 182 and slots 183. The pins 180 are further attached to a sleeve 184$^a$ the axial disposition of which is under the control, as shown, of the collar 185$^a$ and lever 186$^a$.

Rotatably mounted upon the tilting plates 154$^a$, 155$^a$ are tilting rings 160$^a$, 161$^a$ which may for convenience be made in two parts and these are provided with peripheral grooves or slots 187 to accommodate the ends 188 of bell-crank levers 189; these ends 188 may be ball shaped or otherwise suitably constructed so as to allow the necessary relative movement between them and the corresponding ring. The other extremities of the levers 189 are connected to pistons 7$^a$ by links 190.

The other pair of tilting plates 154$^b$, 155$^b$ with their corresponding rings 160$^b$, 161$^b$ is attached to a sleeve shaft 191 by means of trunnions 156$^b$ in a like manner to that in which the first pair is attached to the shaft 1; the adjustment and control likewise is effected through similar mechanism.

The control collar 185$^b$ and lever 186$^b$ are connected to the front control lever 186$^a$ by the levers 192$^a$, 192$^b$ and link 193, the arrangement being such that as the first pair of discs 154$^a$, 155$^a$ is adjusted from zero to maximum opposite tilts the second pair is simultaneously adjusted from maximum opposite tilts to zero.

A suitable cylinder block 4 having radially disposed bores accommodates pistons 7ª, 7ᵇ. The latter are alternately connected to and actuate or are actuated by the respective tilting rings 160ª, 161ª, 160ᵇ, 161ᵇ as hereinbefore described.

Flanges 194, 195 are shown supporting the cylinder block and these may close the ends of the cylinder block hub in order to provide a closed system if desired in which case a non-return fluid supply valve would be necessary as described in other examples. The flange 195 forms part of a sleeve or hollow shaft 196.

The fluid circulation is controlled by means of plug or bush valves 43 axially interposed between the suction and delivery chambers 38, 39 and appropriately registering with fluid suction and delivery ports 40ª, 40ᵇ and 41ª, 41ᵇ respectively. These valves are provided with tappets 197 passing through the flanges 194, 195 and engaging alternately outer and inner discs 198ª, 198ᵇ and 199ª, 199ᵇ respectively, being retained in contact therewith by springs 200. The discs are pivotally mounted on extensions 201, 202 of the shafts 1, 191 respectively, the pivots or trunnions being axially coplanar with the axis of the said shafts and normal both to this axis and to that of the aforementioned trunnions 156ª, 156ᵇ, as illustrated in Figure 28 as is also the control of the same by intermediate cam projections (of which those at the right-hand end are indicated in Figures 28 at 203ª, 203ᵇ, while a similar arrangement of cams is provided at the left-hand end) from the adjacent tilting plates 155ª, 155ᵇ. The cam projections, as illustrated, are necessarily located midway between these respective axes of tilt since these are perpendicular to each other. They are further arranged to engage the discs alternately and thus as the tilting plates are adjusted corresponding adjustment is transmitted oppositely to the discs 198ª, 199ª, 198ᵇ, 199ᵇ.

A variation in construction is here introduced in that the following shaft 2 is not definitely attached to any particular part except through the medium of a selective coupling and for convenience it is here shown as the central and main assembly shaft. Provision is made, as referred to above, for coupling the following shaft 2 to either the sleeve shaft 191 or the sleeve shaft 196 while coupling the shaft which is thus left free of the shaft 2 to a stationary part. Thus when shaft 196 and therefore the cylinder block 4 is coupled to the following shaft 2, shaft 191, the second pair of tilting plates 154ᵇ, 155ᵇ with the valve operating discs 198ᵇ, 199ᵇ are held stationary. This is the normal or usual condition providing a variable forward drive while the converse of this giving a variable reversed drive occurs when the shaft 191 with its tilting plates aforesaid is coupled to the following shaft 2 and the shaft 196 with the cylinder block 4 is held stationary. A convenient embodiment of this principle is well illustrated in the present arrangement and consists in the provision of a sliding sleeve 205 attached to the following shaft 2 by feather keys or splines 206 and provided with dogs which engage corresponding dogs 207, 208 formed respectively on the ends of the shafts 191 and 196. In this instance the slider dogs consist of the splines 206 or extensions of the same formed on the inside of the sleeve 205 to engage the castellated end of the following shaft 2 upon which the sleeve 205 is slidable.

In order to obtain the necessary clearance for the dogs 207 when the dogs 208 are engaged the splines are made deep and an internal recess 209 is provided as shown in Figure 26.

The shafts 191, 196 may be held stationary when required by a sliding pin or by pins 210 operated by or from the same lever 211 which operates the sliding sleeve 205. Thus in the position shown the said sliding sleeve engages and couples together the shaft 196 and the following shaft 2 leaving the dogs on shaft 191 clear in the aforementioned recess 209 while the pin 210 engages suitable dogs or notches 212 in a disc 213 attached to the shaft 191. Operation of the interconnecting lever moves the sliding sleeve 205 into the rearward position and the pin 210 into the forward position. The former thus releases the dogs 208 on shaft 196 and now couples the dogs 207 and shaft 191 to the following shaft 2 while bringing the pin 210 into engagement with notches 214 provided in a plate 215 attached to the cylinder block 4. The pin 210 is provided with a clearance slot 216 so that in its forward position, when it is in engagement with disc 215, the disc 213 registers with the said clearance slot and is free to rotate.

The gear illustrated in Figures 26 to 28 operates as follows:—

The mechanism is in the position illustrated in Figure 26 in the free or neutral condition, the tilting rings 154ª and 155ª, mounted upon the driving shaft 1, being adjusted to zero tilt so that on rotation of the driving shaft same meets with no resistance whatever. In this condition the tilting plates 154ᵇ and 155ᵇ, mounted upon the sleeve 191 at the other end of the mechanism, are adjusted to a maximum tilt. In the normal or forward condition the latter sleeve, with its tilting plates, is anchored, as illustrated and above described, to a stationary part whilst the cylinder block is coupled to and drives the following or output shaft 2.

With the mechanism in this condition the following shaft may be caused to transmit the drive at any desired speed from zero to that of the driving shaft by operation of the control mechanism.

Thus, as adjustment of the first tilting plates 154ª, 155ª is effected and the tilt is increased from zero to a maximum that of the other tilting plates 154ᵇ, 155ᵇ is simultaneously reduced from a maximum to zero and for any intermediate adjustment fluid circulation is maintained by the left-hand part of the mechanism and the pressure energy converted into useful work by the right-hand part of the mechanism. The circulation is effected by displacement of the pistons 7ª in their cylinders 5ª, this displacement being effected from the rotating tilted plates 154ª, 155ª actuating rings 160ª, 161ª, levers 189 and connecting rods 190. The pistons 7ª on the inward stroke at the left-hand or pump end discharge through the ports 41ª into the pressure chamber 39 and on the outward stroke refilling of the cylinders is through the ports 40ª. The ports are covered and uncovered by the slide valves 43, the arrangement and timing being properly made so that the free passages to the chambers 39 and 38 synchronize with the inward and outward strokes respectively and the closures synchronize with the relative return strokes. Distributon of the working fluid to and from the cylinder and a piston of the right-hand or motor end is controlled by exactly similar ports and valves, the arrangement and timing of these being such as to allow passage of fluid under pressure from the chamber 39 during the outward strokes of the pistons and the free passage of the exhaust or return fluid to the chamber 38 during the inward strokes of the pistons.

During initial control the pump end is delivering at low rate and high pressure whilst the motor end has a large receiving capacity. This is accommodated by the mechanism itself, the cylinder block and following shaft falling to a speed much lower than the driving end and thus compensating between delivery and reception. This provides a high velocity ratio and torque augmentation and these reduce towards unity as the control of the mechanism continues. Final adjustment, as previously described, brings the mechanism into a condition when the pump has its maximum discharging capacity but the motor end has no capacity to receive so that there is thus obtaining a locked hydraulic system and a direct through drive.

The direction of the following shaft may be obtained in this instance by making the cylinder block stationary and coupling the sleeve 191 carrying the tilting plates to the following shaft. The motor thus becomes a reversed engine—as a mechanism—although the hydraulic functioning is the same as that just described for obtaining forward drive. It will however be observed that the speeds and torque of the input and output shafts are equal when the tilts are equal which is at half maximum control.

Referring to the form of gear illustrated in Figures 29 to 33 same embodies a complete departure in the interconnection of the several components, also the adoption of a purely mechanical reverse gear mechanism.

The cylinder block is here separated into two parts $4^a$, $4^b$, the block $4^a$ being attached to the driving shaft 1 and driven therefrom. The latter is in this case shown as the shaft of a driving motor.

The second block $4^b$ is attached to the casing 3 and an intermediate following shaft $2^c$ now carries both pairs of adjustable rings $9^a$, $10^a$, $9^b$, $10^b$. These rings actuate or are actuated by rollers 11 mounted on pistons $7^a$, $8^a$, $7^b$, $8^b$ which work in corresponding bores $5^a$, $6^a$, $5^b$, $6^b$, formed in the respective cylinder blocks, the bores in the groups 5 being angularly staggered relatively to those in the groups 6.

The actuation of the pistons is alternately arranged from the rings 9, 10 and they are retained in contact with the said rings by suitable springs 217.

Both pairs of rings are adjustable radially by sliding cams 218 which operate the rings through the medium of radial tappets or pins 219 which slide in members 220 secured to a flange 17 integrally formed with the following shaft $2^c$.

The control of these cams 218 is effected by a ball bearing collar 221 which is connected by rods 222 to a cross bar 223 having a hub 224 which is controlled by pins 225 and levers 226. The cams 218 are so arranged that initially the rings $9^a$, $10^a$ are concentric with the axis of rotation while the rings $9^b$, $10^b$ have maximum eccentricities or throws oppositely disposed. Further, as adjustment is effected the rings $9^a$, $10^a$ move oppositely from zero to maximum eccentricity while the rings $9^b$, $10^b$ move from maximum to zero eccentricity.

The flange 17 formed as previously mentioned with the following shaft $2^c$, or attached thereto, is provided with annularly disposed suction and delivery chambers 38, 39. These chambers are provided with facial ports 44, 45 illustrated in Figure 32 interconnected by openings 227 shown in Figure 33. The cylinder block hubs are provided with ports 40, 41 for delivery and return of the working fluid and these ports are contrived, as illustrated, so that communication is made between the cylinders $5^a$, $6^a$ and the delivery chamber 39 during the inward strokes of the pistons $7^a$, $8^a$ and with the suction chamber 38 during the outward stroke of the pistons $7^a$, $8^a$ while the reverse process takes place between the ports 44, 45 and the ports 40, 41 of the cylinders $5^b$, $6^b$. It will be observed that two pairs of ports are provided serving respectively alternate cylinders 5, 6.

This arrangement illustrates further mechanical reversing mechanism. Thus the following shaft 2 is connected to the intermediate shaft $2^c$ through the medium of said reversing mechanism. This may consist of an annular wheel 228 mounted upon the following shaft 2 and a pinion 229 mounted upon shaft $2^c$ interconnected by planet wheels 230. The said planet wheels are mounted upon pins 231, 232 carried by a suitable housing 233, the said pins being constructed in two eccentric parts, the one part 231 being fixed to the housing 233 while the other part 232 is provided with means for sliding it inside the pin 231. Thus the pin 232 is shown in its rearward position and engages one of a plurality of corresponding holes 234 formed in the flange of the wheel 228. This gives a locked and therefore forward drive. If the pin 232 is now moved into its forward position it engages one of a plurality of holes 235 formed in a member 236 attached to the casing 3, being then disengaged from the wheel 228 and anchoring the housing 233 to the stationary member 236.

The planet wheels 230 now have fixed axes and thus transmit a reversed drive between the shaft $2^c$ and the final following shaft 2. The pins 232 may be retained in either position as desired by any suitable means, such as the spring-loaded ball 237, and drill pipe 238. The manipulation of the pin 232 is effected by an outer sleeve 239 attached thereto through pins 240 and operated by a straddle lever 241.

The gear illustrated in Figures 29 to 33 operates as follows:—

Figure 29:
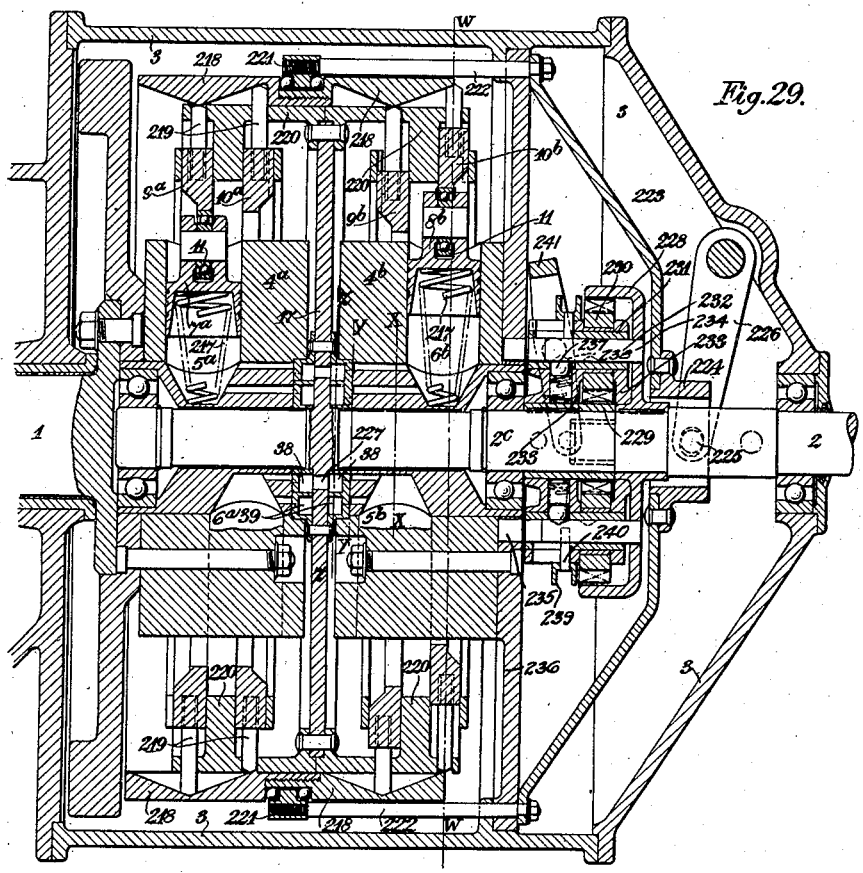
Figure 29 is a sectional side elevation of still a further form of gear in accordance with the invention taken on the line V—V of Figure 30.

The mechanism in the position illustrated in Figure 29 is in the free condition, the first cylinder block $4^a$ being attached to the driving shaft 1 so that no resistance is offered since the discs $9^a$ and $10^a$ operating the pistons $7^a$, $8^a$ have zero eccentricity and can produce no displacement of fluid. The other (motor) discs $9^b$, $10^b$ which in this case, as well as the first (pump) discs, are attached to the following shaft $2^c$, are adjusted to maximum eccentricity.

Operation of the control mechanism gives the pump discs some eccentricity whilst reducing that of the motor discs and any rotation of the driving shaft will cause the pump pistons to reciprocate. On their inward strokes the displaced fluid will pass through the ports 41, 45 to the pressure chamber 39 whilst the return flow from the chamber 38 on their outward strokes will be via the ports 44 and 40. The arrangement and timing of the ports is such as to give the correct openings and closures as described. Fluid under pressure passes from the pressure chamber to the pistons in the motor end on their outward travel and exhausts on their inward strokes into the chamber 38 through similar ports arranged and timed to give this effect.

As the control is operated the capacity of the pump is progressively increased to a maximum whilst the receiving capacity of the motor is progressively decreased to zero at which point a locked hydraulic system is obtained giving a direct drive. At any intermediate position the reception of the motor will adjust itself by a relative speed reduction corresponding to the position of adjustment and since the fluid pressure will be high at small strokes the motor torque will be correspondingly high, decreasing to zero at direct drive when the pump reactionary torque only will be transmitted.

Reverse in this instance is obtained by a purely mechanical device.

Referring to the form of gear illustrated in Figures 34 to 39 same illustrates a still further combination of the various parts. The cylinder block is here made in two separate parts 4ª, 4ᵇ, the first block 4ª being attached to the driving shaft 1, here shown as forming part of a motor shaft, and pistons 7ª, 8ª are operated by adjustable rings 9ª, 10ª through rollers 11. The rollers are retained in engagement with the said rings by keep rings 15 which are slotted at 242 in order to accommodate the ends 13 of the pistons.

The keep rings 15 engage with stirrups 243 pivotally attached to roller pins 244, this being necessary since the piston axes have fixed directions while the stirrup axes, not unlike connecting rods, remain radial to the rings 15.

The first pair of rings 9ª, 10ª is carried by a member 245 which, together with the second cylinder block 4ᵇ, is attached to the following shaft 2. The connection between the pistons 7ᵇ, 8ᵇ and their adjustable rings 9ᵇ, 10ᵇ is of like kind to that adopted for the pistons 7ª, 8ª and previously described while the rings 9ᵇ, 10ᵇ are carried by a member 246 attached to the casing 3. The adjustment of the rings is effected by cam members 247, 248 which are carried by their respective members 245, 246, the member 245 rotating with the cylinder block 4ᵇ and following shaft 2 while the member 246 is stationary. The cams 247, 248 are formed with inclined projections 250 to engage appropriate slots 251 in the edges of the eccentric rings, as illustrated in Figure 36. The cam members 247, 248 are connected, as shown in Figure 37, by a ball bearing 252 and a single control of adjustment is effected by a lever 253 and pin 254 engaging a sleeve 255 and cross bar 256 which latter is attached to the stationary cam members 248 at 257.

The cams are so arranged that initially the rings 9ª, 10ª are concentric with the axis of rotation while the rings 9ᵇ, 10ᵇ have maximum eccentricities or throws oppositely disposed. As the adjustment is effected the rings 9ª, 10ª move oppositely from zero to maximum eccentricity while the rings 9ᵇ, 10ᵇ move from maximum to zero eccentricity.

Suction and delivery chambers 38, 39 are accommodated in the hubs of the cylinder blocks and interconnected by openings 258 in the central flange 17 of the following shaft 2. Communication between the cylinders 5ª, 6ª and the said chambers is, in this instance, by non-return suction and delivery valves 36, 37 while communication with the second series of cylinders is through ports 40, 41 under the control of a fixed sleeve valve 43 having appropriate ports 44, 45. An extra port 259 is provided in the sleeve 43 so that reverse may be obtained by an axial displacement of the sleeve 43. This sleeve is connected by pins 260 to control levers 261. Axial displacement of the sleeve may thus be provided whereby the port 259 which is ineffective in forward gear and the adjacent ports 44, 45 may be brought into register with the ports 40, 41 at the same time rendering the remotest port ineffective. This reverses the relative disposition of the ports and their functioning thus introducing reversed rotation of the following shaft 2.

Figure 34:
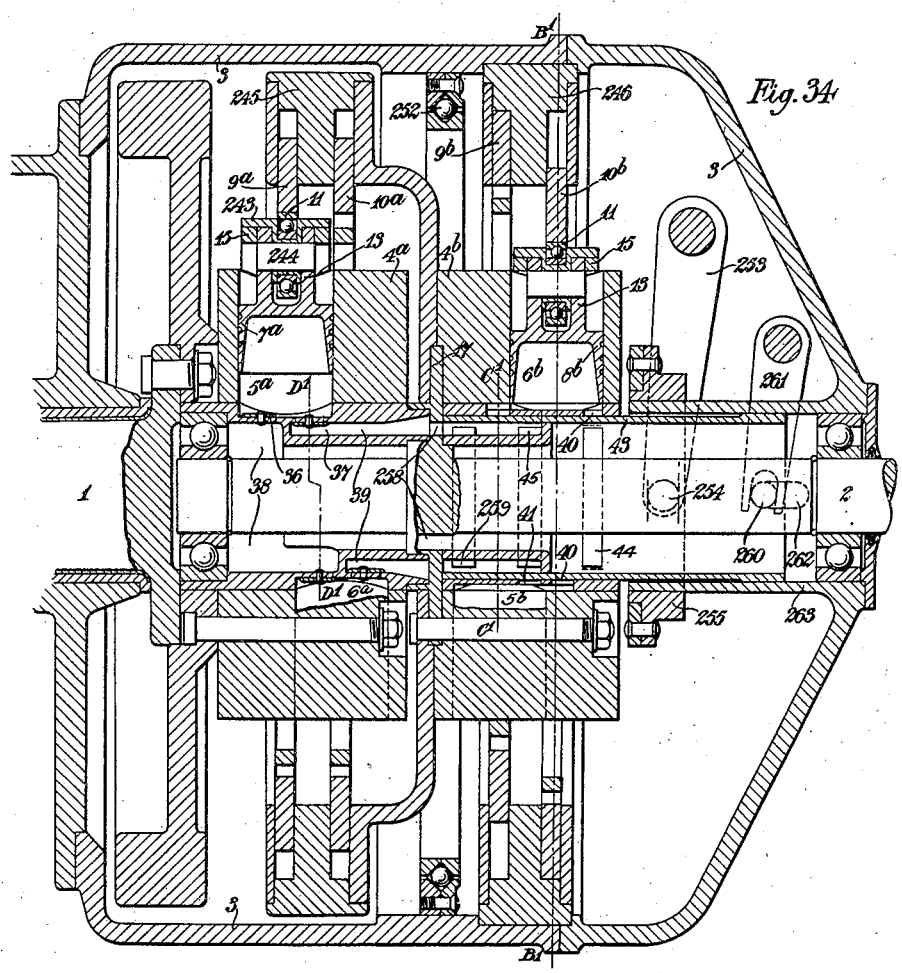
Figure 34 is a sectional side elevation of still a further form of gear in accordance with the invention taken on the line A'—A' of Figure 35.

The gear illustrated in Figures 34 to 35 is as follows:—

The mechanism in the position illustrated in Figure 34 is in the neutral condition, the driving shaft 1 and first or pump cylinder block 4ª being free to rotate since the actuating discs 9ª, 10ª are set at zero eccentricity so that no motion can be imparted to their respective pistons 7ª and 8ª. The other or motor discs 9ᵇ, 10ᵇ are set at maximum eccentricity and are in this instance attached to a stationary part. The motor cylinder block 4ᵇ and the pump actuating discs 9ª, 10ª are secured to the following shaft 2.

Operation of the control gives the pump discs eccentric adjustment increasing from zero to a maximum whilst the eccentricity of the motor correspondingly decreases to zero and at any intermediate position rotation of the driving shaft carries round the pump cylinder block with its pistons causing the latter to reciprocate through the medium of the now eccentric discs 9ª, 9ᵇ. On the inward travel of these pistons, working fluid is delivered under pressure through the non-return valves 37 to the pressure chamber 39 whilst on the outward strokes fluid returns from the exhaust chamber 38 through the suction valves 36. From the pressure chamber 39, working fluid passes to the pistons 7ᵇ, 8ᵇ of the motor while on their outward strokes the fluid passes through the ports 45 being returned on the inward strokes to the exhaust chamber 38 via the ports 44, the ports 44 and 45 being so arranged as to give this effect.

In these intermediate positions the varying capacities of the pump end and motor end accommodate each other by variation in relative speed and torque of these two. Thus, at initial controls the velocity ratio and the torque augmentation are high and approach unity as operation of the control is continued. Finally, when the pump end has its maximum capacity and the receiving capacity of the motor is reduced to zero, a locked hydraulic system giving direct drive, is obtained.

Reverse is here obtained by reversing the direction of circulation of the working fluid in the motor and this is effected by moving the sleeve 43, in which the ports 45 and 44 are formed, axially. This brings the port 44 into an ineffective position and the port 45 into a new phase at 180° to its former position while an additional port 259 is brought into operation, the latter port being ineffective in its former position. This in effect alters all the ports through a phase of 180° thus reversing the flow and consequently the direction of rotation of the mechanism.

Referring to the form of gear illustrated diagrammatically in Figure 40 this represents a further method of arranging the previously-described elements of such gears. The driving shaft 1 carries adjustable rings 9ª, 10ª by which pistons are reciprocated in bores 5ª, 6ª formed in a cylinder block 4ª. This cylinder block is attached to the following shaft 2 and carries adjustable rings 9ᵇ, 10ᵇ engaged by pistons which reciprocate in bores 5ᵇ, 6ᵇ formed in a cylinder block 4ᵇ attached to the casing 3. The adjustment of the discs and the valve mechanism may be as described for any of the other forms of gear and the operation of this form will be generally similar to that of those already considered.

It is to be understood that the invention is not limited to the above details and arrangements but is capable of various modifications depending upon any particular requirements or practical conditions it may be desired to fulfill, the improved mechanism being capable of application in any case where a variable drive or retarding action in any direction is desired such, for instance, as in self-propelled vehicles on land, air or sea, factory drives, machine tools, manipulation of heavy guns, drawbridges, turntables, cranes, lifts and the like.

Having now described my invention, what I claim as new and desire to secure by Letters Patent is:—

1. Hydraulic variable transmission mechanism comprising in combination a driving shaft and a driven shaft, a reciprocating pump adapted to circulate the working fluid and comprising cylinders carried by the driven shaft and pistons for reciprocation in said cylinders, a second reciprocating pump adapted to receive the fluid circulated by the first said pump and comprising cylinders also carried by the driven shaft and pistons for reciprocation in said latter cylinders, means carried by the driving shaft adapted to vary the stroke of the pistons of the first pump, means carried by a stationary part adapted to vary the stroke of the pistons of said second pump, and means connecting said two stroke varying means so that as the stroke of the pistons of the first pump is increased from zero to maximum the stroke of the pistons of the second pump is simultaneously and correspondingly decreased from maximum to zero.

2. Hydraulic variable transmission mechanism comprising in combination a driving shaft and a driven shaft, a reciprocating pump adapted to circulate the working fluid and comprising cylinders carried by the driven shaft and pistons for reciprocation in said cylinders, a second reciprocating pump adapted to receive the fluid circulated by the first said pump and comprising cylinders also carried by the driven shaft and pistons for reciprocation in said latter cylinders, means carried by the driving shaft adapted to vary the stroke of the pistons of the first pump, means carried by a stationary part adapted to vary the stroke of the pistons of said second pump and means connecting said two stroke varying means so that as the stroke of the pistons of the first pump is increased from zero to maximum the stroke of the pistons of the second pump is simultaneously and correspondingly decreased from maximum to zero and so that when the stroke of the first pump is zero and the stroke of the second at a maximum no drive is transmitted, this being the neutral condition of the mechanism.

3. Hydraulic variable transmission mechanism comprising in combination a driving shaft and a driven shaft, a reciprocating pump adapted to circulate the working fluid and comprising cylinders carried by the driven shaft and pistons for reciprocation in said cylinders, a second reciprocating pump adapted to receive the fluid circulated by the first said pump and comprising cylinders also carried by the driven shaft and pistons for reciprocation in said latter cylinders, means carried by the driving shaft adapted to vary the stroke of the pistons of the first pump, means carried by a stationary part adapted to vary the stroke of the pistons of said second pump and means connecting said two stroke varying means so that as the stroke of the pistons of the first pump is increased from zero to maximum the stroke of the pistons of the second pump is simultaneously and correspondingly decreased from maximum to zero and so that when the stroke of the first pump is a maximum and the stroke of the second pump is zero a solid drive is obtained.

4. Hydraulic variable transmission mechanism comprising in combination a driving shaft and a driven shaft, a reciprocating pump adapted to circulate the working fluid and comprising cylinders carried by the driven shaft and pistons for reciprocation in said cylinders, a second reciprocating pump adapted to receive the fluid circulated by the first said pump and comprising cylinders also carried by the driven shaft and pistons for reciprocation in said latter cylinders, means carried by the driving shaft adapted to vary the stroke of the pistons of the first pump, means carried by a stationary part adapted to vary the stroke of the pistons of said second pump and means connecting said two stroke varying means so that as the stroke of the pistons of the first pump is increased from zero to maximum the stroke of the pistons of the second pump is simultaneously and correspondingly decreased from maximum to zero and so that when the two pumps have strokes intermediate their zero and maximum values the ratio of the mechanism has a value intermediate the neutral and solid drive conditions thereof.

5. Hydraulic variable transmission mechanism comprising in combination a driving shaft and a driven shaft, a reciprocating pump adapted to circulate the working fluid and comprising cylinders carried by the driven shaft and pistons for reciprocation in said cylinders, a second pump adapted to receive the working fluid circulated by the first said pump and comprising cylinders also carried by the driven shaft and pistons for reciprocation in said latter cylinders, a valve in each cylinder of the first pump adapted to permit working fluid to be drawn into these cylinders, another valve in each cylinder of the first pump adapted to permit of the discharge of the working fluid circulated by this pump, a chamber adapted to receive the working fluid discharged from the first pump, a valve in said chamber adapted to permit of the discharge of the working fluid therefrom into the cylinders of the second pump, means carried by the driving shaft adapted to vary the stroke of the pistons of the first pump, means carried by a stationary part adapted to vary the stroke of the pistons of the second pump and means connecting said two stroke varying means so that as the stroke of the pistons of the first pump is increased from zero to maximum the stroke of the pistons of the second pump is simultaneously and correspondingly decreased from maximum to zero.

6. Hydraulic variable transmission mechanism comprising in combination a driving shaft and a driven shaft, a reciprocating pump adapted to circulate the working fluid and comprising cylinders carried by the driven shaft and pistons for reciprocation in said cylinders, a second pump adapted to receive the working fluid circulated by the first said pump and comprising cylinders also carried by the driven shaft and pistons for reciprocation in said latter cylinders, a valve in each cylinder of the first pump adapted to permit working fluid to be drawn into these cylinders, another valve in each cylinder of the first pump adapted to permit of the discharge of the working fluid circulated by this pump, a chamber adapted to receive the working fluid discharged from the first pump, a valve in said chamber adapted to permit of the discharge of the working fluid therefrom into the cylinders of the second pump, another valve in association with each cylinder of the second pump adapted to permit of the discharge of the working fluid from the cylinders of this pump, another chamber adapted to receive the fluid discharged from said second pump and to deliver this fluid to the inlet valves of said first pump, means carried by the driving shaft adapted to vary the stroke of the pistons of the first pump, means carried by a stationary part adapted to vary the stroke of the pistons of the second pump and means connecting said two stroke varying means so that as the stroke of the pistons of the first pump is increased from zero to maximum the stroke of the pistons of the second pump is simultaneously and correspondingly decreased from maximum to zero.

7. Hydraulic variable transmission mechanism comprising in combination a driving shaft and a driven shaft, a reciprocating pump adapted to circulate the working fluid and comprising cylinders carried by the driven shaft and pistons for reciprocation in said cylinders, a second reciprocating pump adapted to receive the fluid circulated by the first said pump and comprising cylinders also carried by the driven shaft and pistons for reciprocation in said latter cylinders, a chamber adapted to receive the working fluid discharged from said first pump, another chamber adapted to receive the fluid discharged from said second pump, oscillatory valves each having two sets of ports therein one of which sets of ports is adapted to provide communication between the first said chamber and the cylinders of the second pump and the other set of ports being adapted to provide communication between the cylinders of said second pump and the second said chamber, means adapted to oscillate said valves so as to open and close the ports therein to their respective chambers, means carried by the driving shaft adapted to vary the stroke of the pistons of the first pump, means carried by a stationary part adapted to vary the stroke of the pistons of the second pump and means connecting said two stroke varying means so that as the stroke of the pistons of the first pump is increased from zero to maximum the stroke of the pistons of the second pump is simultaneously and correspondingly decreased from maximum to zero.

8. Hydraulic variable transmission mechanism comprising in combination a driving shaft and a driven shaft, a reciprocating pump adapted to circulate the working fluid and comprising cylinders carried by the driven shaft and pistons for reciprocation in said cyinders, a second pump adapted to receive the fluid circulated by the first said pump and comprising cylinders also carried by the driven shaft and pistons for reciprocation in said latter cylinders, a pair of eccentrics carried by the driving shaft and adapted to vary the stroke of the pistons of the first pump and a pair of eccentrics carried by a stationary part and adapted to vary the stroke of the second pump and means connecting said two stroke varying means so that as the stroke of the pistons of the first pump is increased from zero to maximum the stroke of the pistons of the second pump is simultaneously and correspondingly decreased from maximum to zero, said pairs of eccentrics being adapted so that dynamic balance of the mechanism is obtained.

9. Hydraulic variable transmission mechanism comprising in combination a driving shaft and a driven shaft, a reciprocating pump adapted to circulate the working fluid and comprising cylinders carried by the driven shaft and pistons for reciprocation in said cylinders, a second pump adapted to receive the fluid circulated by the first said pump and comprising cylinders also carried by the driven shaft and pistons for reciprocation in said latter cylinders, a pair of eccentrics carried by the driving shaft and adapted to vary the stroke of the pistons of the first pump, a pair of eccentrics carried by a stationary part and adapted to vary the stroke of the second pump and means connecting said two stroke varying means so that as the stroke of the pistons of the first pump is increased from zero to maximum the stroke of the pistons of the second pump is simultaneously and correspondingly decreased from maximum to zero, said pair of eccentrics for each pump being adapted to operate upon alternate pistons thereof whereby a torque balance is obtained.

JESSE BEDFORD.